(12) United States Patent
Matsuda et al.

(10) Patent No.: US 11,487,002 B2
(45) Date of Patent: Nov. 1, 2022

(54) MEASUREMENT DEVICE, MEASUREMENT METHOD, AND NON-TRANSITORY STORAGE MEDIUM

(71) Applicant: PIONEER CORPORATION, Tokyo (JP)

(72) Inventors: Takehiro Matsuda, Tokyo (JP); Shogo Miyanabe, Tokyo (JP)

(73) Assignee: PIONEER CORPORATION, Tokyo (JP)

( * ) Notice: Subject to any disclaimer, the term of this patent is extended or adjusted under 35 U.S.C. 154(b) by 832 days.

(21) Appl. No.: 16/327,799

(22) PCT Filed: Aug. 25, 2017

(86) PCT No.: PCT/JP2017/030588
§ 371 (c)(1),
(2) Date: Feb. 22, 2019

(87) PCT Pub. No.: WO2018/038262
PCT Pub. Date: Mar. 1, 2018

(65) Prior Publication Data
US 2019/0187276 A1    Jun. 20, 2019

(30) Foreign Application Priority Data

Aug. 26, 2016    (JP) .............................. JP2016-165818

(51) Int. Cl.
*G01S 13/93*    (2020.01)
*G01S 17/93*    (2020.01)
(Continued)

(52) U.S. Cl.
CPC .............. *G01S 13/93* (2013.01); *G01C 3/08* (2013.01); *G01S 17/93* (2013.01); *G01S 17/931* (2020.01)

(58) Field of Classification Search
CPC ...................................................... G01S 13/93
See application file for complete search history.

(56) References Cited

U.S. PATENT DOCUMENTS

| 4,632,543 A | 12/1986 | Endo |
| 5,726,647 A | 3/1998 | Waffler et al. |
| (Continued) | | |

FOREIGN PATENT DOCUMENTS

| CN | 104002809 A | 8/2014 |
| JP | S55-001555 B | 1/1980 |
| (Continued) | | |

OTHER PUBLICATIONS

International Search Report for related International Application No. PCT/JP2017/030588, dated Oct. 31, 2017; 3 pages.

(Continued)

*Primary Examiner* — Erin F Heard
*Assistant Examiner* — Hailey R Le
(74) *Attorney, Agent, or Firm* — Procopio, Cory, Hargreaves & Savitch, LLP

(57) ABSTRACT

A measurement device (200) includes a measurement unit (202) which performs measurement by emitting electromagnetic waves and scanning an object with the electromagnetic waves, and a control unit (204) which controls the measurement unit (202). The measurement unit (202) is operable in a first scan mode in which the object is scanned in a first direction, or a second scan mode in which the object is scanned in a second direction different from the first direction. The control unit (204) determines a scan mode to be executed by the measurement unit (202).

16 Claims, 12 Drawing Sheets

(51) Int. Cl.
    *G01S 17/931*     (2020.01)
    *G01C 3/08*     (2006.01)

(56) References Cited

U.S. PATENT DOCUMENTS

| | | |
|---|---|---|
| 5,760,886 A | 6/1998 | Miyazaki |
| 7,570,346 B2 | 8/2009 | Yamaguchi et al. |
| 8,134,491 B1 * | 3/2012 | Meyer ............... G01S 13/48 342/75 |
| 2004/0145513 A1 * | 7/2004 | Katayama ............ G01S 13/426 342/107 |
| 2006/0215148 A1 | 9/2006 | Yamaguchi et al. |
| 2006/0244978 A1 * | 11/2006 | Yamada ............... G01S 17/931 356/614 |
| 2016/0047895 A1 | 2/2016 | Dussan |

FOREIGN PATENT DOCUMENTS

| | | | | |
|---|---|---|---|---|
| JP | 2621511 B | | 5/1991 | |
| JP | H03125985 A | * | 5/1991 | ............ G01S 13/93 |
| JP | H07-098381 A | | 4/1995 | |
| JP | H10-123246 A1 | | 5/1998 | |
| JP | 2001-183462 A | | 7/2001 | |
| JP | 2006-258604 A | | 9/2006 | |

OTHER PUBLICATIONS

EESR for the corresponding EP App. No. 17843738.0 dated Mar. 17, 2020; 8 pages.
Office Action for related JP App. No. 2018535786 dated Feb. 4, 2020. English abstract provided; 3 pages.

* cited by examiner

MEASUREMENT DEVICE, MEASUREMENT METHOD, AND NON-TRANSITORY STORAGE MEDIUM

CROSS-REFERENCE TO RELATED APPLICATIONS

This application is a U.S. National Stage entry of PCT Application No: PCT/JP2017/030588 filed Aug. 25, 2017, which claims priority to Japanese Patent Application No. 2016-165818, filed Aug. 26, 2016, the contents of which are incorporated herein by reference.

TECHNICAL FIELD

The present invention relates to a measurement device, a measurement method, and a program.

BACKGROUND ART

A technique related to the present invention is disclosed in Patent Document 1. Patent Document 1 discloses a detection apparatus that irradiates a target area with laser beams in a state of being mounted to a moving body, and detects an obstacle in the target area. The detection apparatus causes a laser beam to scan in a scanning pattern according to the moving body turning right, turning left, travelling with a high speed, or the like.

RELATED DOCUMENT

Patent Document

[Patent Document 1] Japanese Patent Application Laid-open Publication No. 2006-258604

SUMMARY OF THE INVENTION

Technical Problem

Patent Document 1 discloses a plurality of scanning patterns for horizontally moving a vertical scanning line, but in all the patterns, the vertical scanning line is moved in one direction from the right to the left, so the patterns belong to one-type of pattern. An object of the present invention is to provide a new scanning method.

Solution to Problem

The invention described in claim 1 is a measurement device including
a measurement unit which performs measurement by emitting electromagnetic waves and scanning an object with the electromagnetic waves; and
a control unit which controls the measurement unit,
in which the measurement unit is operable in a first scan mode in which the object is scanned in a first direction, or a second scan mode in which the object is scanned in a second direction different from the first direction, and
the control unit determines a scan mode to be executed by the measurement unit.
The invention described in claim 12 is a measurement method executed by a computer, including
a measurement step of performing measurement by emitting electromagnetic waves and scanning an object with the electromagnetic waves; and
a control step of controlling the measurement step,
in which in the measurement step, it is operable in a first scan mode in which the object is scanned in a first direction, or a second scan mode in which the object is scanned in a second direction different from the first direction, and
in which in the control step, a scan mode to be executed in the measurement step is determined.
The invention described in claim 13 is a program causing a computer to function as
a measurement unit which performs measurement by emitting electromagnetic waves and scanning an object with the electromagnetic waves; and
a control unit which controls the measurement unit,
in which the measurement unit is operable in a first scan mode in which the object is scanned in a first direction, or a second scan mode in which the object is scanned in a second direction different from the first direction, and
the control unit determines a scan mode to be executed by the measurement unit.

BRIEF DESCRIPTION OF THE DRAWINGS

The above objects and other objects, features and advantages will become more apparent from the following description of a preferred embodiment of the invention and the accompanying drawings.

DESCRIPTION OF EMBODIMENTS

Figure 1:
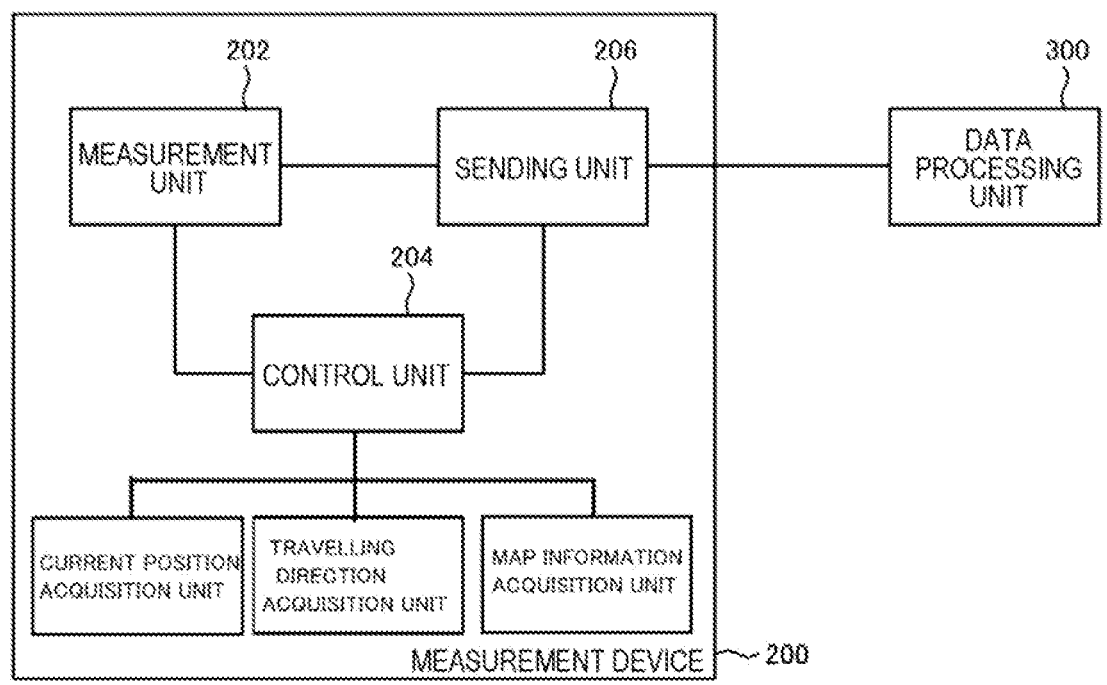
FIG. 1 is an example of a functional block diagram of a measurement device.

Hereinafter, embodiments of the present invention will be described with reference to the drawings. In all the drawings, the same constituent elements are denoted by the same reference numerals, and the description thereof will not be repeated as appropriate.

<<Outline of Measurement Device>>

A measurement device according to the present embodiment includes a measurement unit which performs measurement by emitting electromagnetic waves and scanning an object with the electromagnetic waves, and a control unit which controls the measurement unit. The measurement unit is operable in a first scan mode in which the object is scanned in a first direction, or a second scan mode in which the object is scanned in a second direction different from the first direction. The control unit can determine a scan mode to be executed by the measurement unit.

According to the measurement device of the present embodiment, it is possible to select an appropriate one scan mode from a plurality of scan modes according to a situation, and perform scanning and measurement. According to the measurement device of the present embodiment, variations in scanning are increased.

<<Configuration of Measurement Device>>

FIG. 1 shows an example of a functional block diagram of a measurement device 200 of the present embodiment. As shown in FIG. 1, the measurement device 200 includes a measurement unit 202 that performs measurement by scanning a target area with an electromagnetic wave, a sending unit 206 that sends a measurement result obtained by the measurement unit 202 (information indicating a position of an object irradiated with the electromagnetic wave in the target area and a distance between the object and the measurement device 200) to a data processing unit 300, and a control unit 204 that controls the measurement unit 202 and the sending unit 206. The data processing unit 300 may be provided in the measurement device 200 or may be provided in an external apparatus physically and/or logically separated from the measurement device 200. The data processing unit 300 executes a predetermined process (detection, notification, or the like of an obstacle), based on the received measurement result.

<Hardware Configuration>

Each functional configuration unit of the measurement device 200 may be configured with hardware (for example, a hard-wired electronic circuit) that implements each functional configuration unit, or a combination of hardware and software (for example, a combination of an electronic circuit, a program for controlling the electronic circuit, and the like). Hereinafter, the case where each functional configuration unit of the measurement device 200 is configured with a combination of hardware and software will be further described.

"Hardware Configuration of the Control Unit 204 and the Sending Unit 206"

Figure 2:
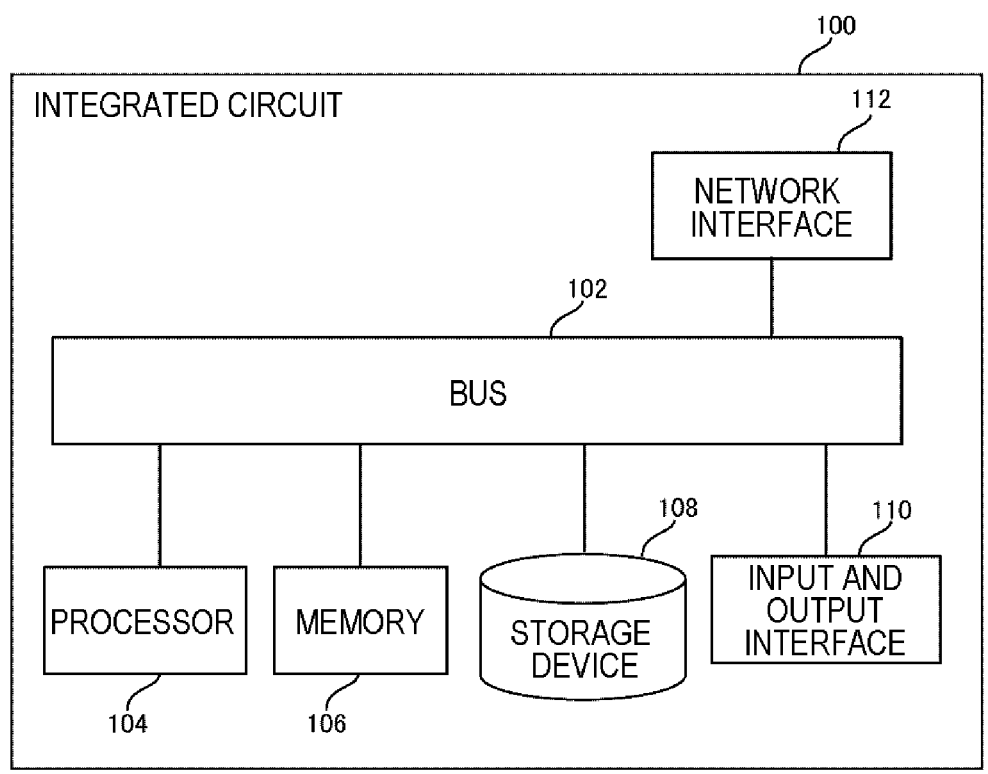
FIG. 2 is a diagram illustrating a hardware configuration of a control unit and a sending unit.

FIG. 2 is a diagram illustrating a hardware configuration that realizes the control unit 204 and the sending unit 206. An integrated circuit 100 is an integrated circuit that realizes the control unit 204 and the sending unit 206. For example, the integrated circuit 100 is a system on chip (SoC).

The integrated circuit 100 includes a bus 102, a processor 104, a memory 106, a storage device 108, an input and output interface 110, and a network interface 112. The bus 102 is a data transmission path through which the processor 104, the memory 106, the storage device 108, the input and output interface 110, and the network interface 112 mutually transmit and receive data. However, a method of connecting the processor 104 and other elements to each other is not limited to bus connection. The processor 104 is an arithmetic processing unit configured with a microprocessor or the like. The memory 106 is a memory configured with a random access memory (RAM) or the like. The storage device 108 is a storage device configured with a read only memory (ROM), a flash memory, or the like.

The input and output interface 110 is an interface for connecting the integrated circuit 100 to peripheral devices.

The network interface 112 is an interface for connecting the integrated circuit 100 to a communication network. A controller area network (CAN), Ethernet, or the like is illustrated as a communication network, but the communication network is not limited thereto. Note that, the method by which the network interface 112 connects to the communication network may be a wireless connection or a wired connection.

The storage device 108 stores program modules for realizing functions of the control unit 204 and the sending unit 206. The processor 104 realizes the functions of the control unit 204 and the sending unit 206 by reading the program module into the memory 106 and executing it.

Note that, the hardware configuration of the integrated circuit 100 is not limited to the configuration illustrated in FIG. 2. For example, the program module may be stored in the memory 106. In this case, the integrated circuit 100 may not include the storage device 108.

"Hardware Configuration of Measurement Unit 202"

Figure 3:
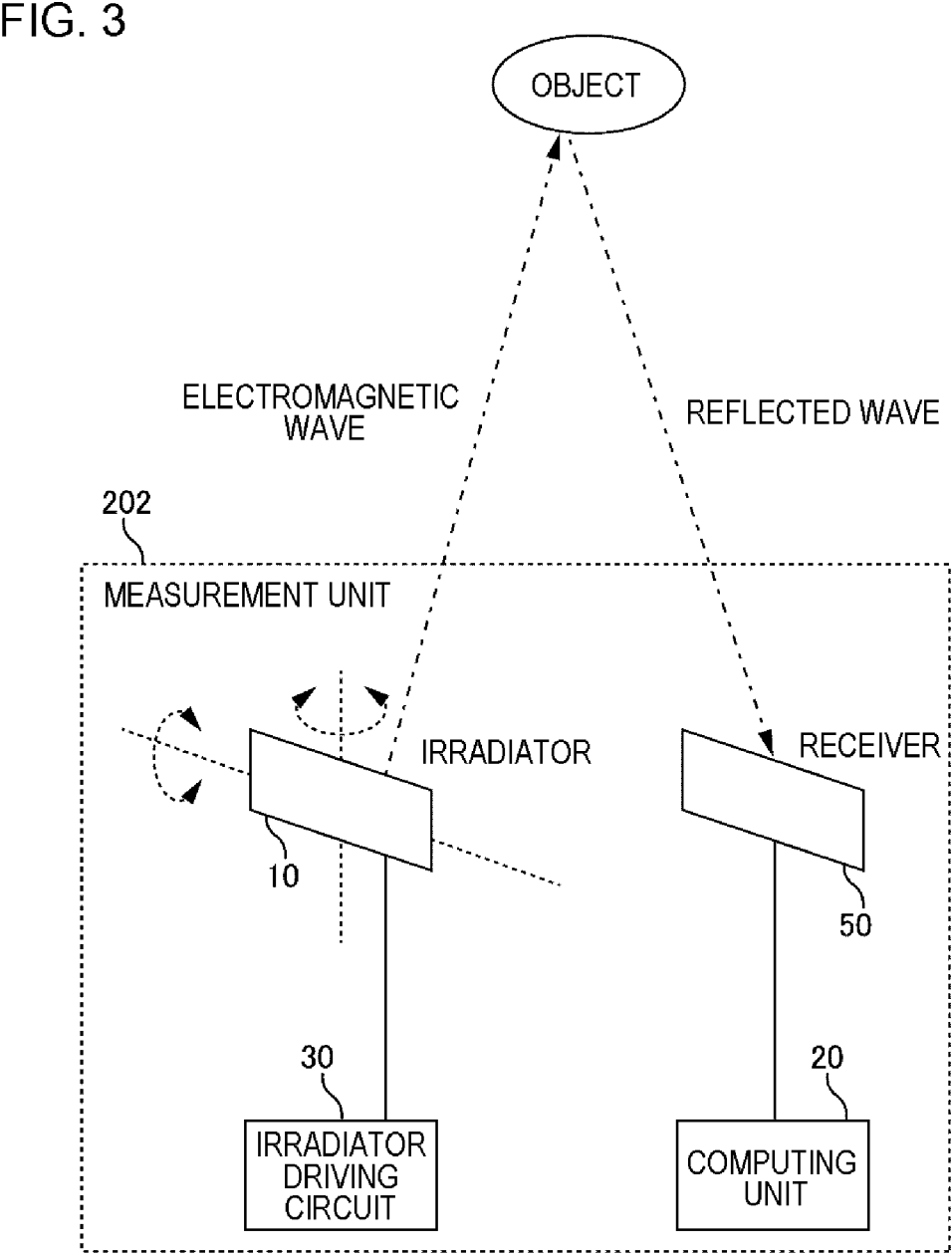
FIG. 3 is a diagram illustrating a hardware configuration of a measurement unit.
Figure 11:
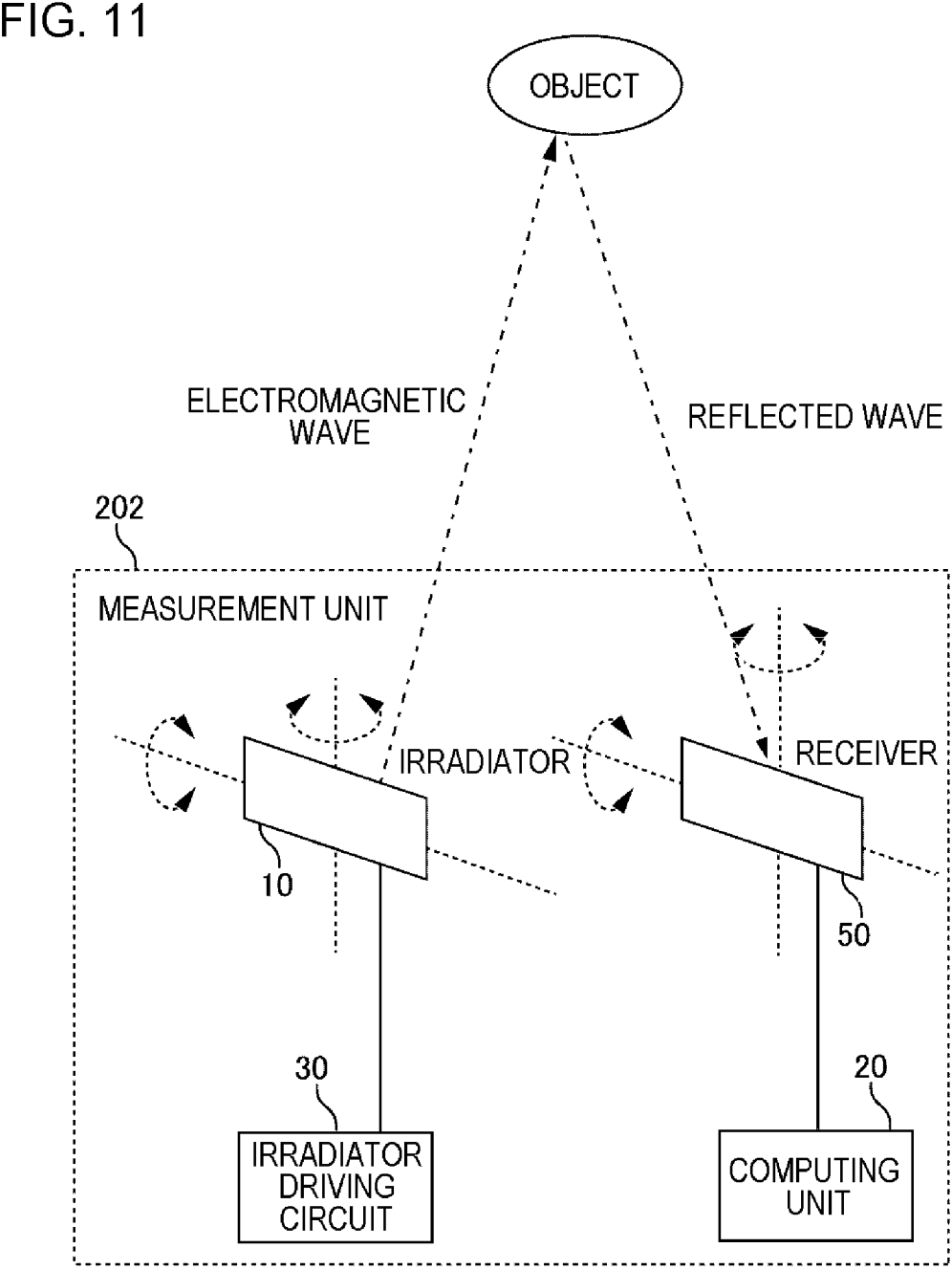
FIG. 11 is a diagram illustrating a hardware configuration of the measurement unit.

FIG. 3 and FIG. 11 are diagrams illustrating a hardware configuration that realizes the measurement unit 202. The measurement unit 202 includes an irradiator 10, a computing unit 20, an irradiator driving circuit 30, and a receiver 50.

The irradiator 10 emits electromagnetic waves used for scanning. The electromagnetic waves emitted by the irradiator 10 may be light such as a laser beam or a radio wave such as a millimeter wave. The irradiator 10 has a configuration in which the irradiation direction is variable, and can emit electromagnetic waves in various directions.

The irradiator driving circuit 30 is a circuit for driving the irradiator 10. In the present embodiment, the irradiator 10 irradiates a predetermined target region F with electromagnetic waves while moving the vertical scanning line in the horizontal direction under the control of the irradiator driving circuit 30 (see FIG. 4). That is, the irradiator 10 emits the electromagnetic waves so as to scan the predetermined range, and as a result, the object present in the predetermined range is scanned with the electromagnetic waves.

The receiver 50 receives the reflected wave of the electromagnetic waves emitted to the outside of the measurement device 200. That is, the receiver 50 receives the reflected wave of the electromagnetic wave emitted by the irradiator 10, which is reflected by the object existing around the measurement device. As shown in FIG. 11, the receiver 50 may be configured to be driven to rotate similarly to the irradiator 10. The rotational driving of the receiver 50 is controlled by a driving circuit (not shown). Note that, the rotational driving of the irradiator 10 and the rotational driving of the receiver 50 may be performed in synchronization with each other. In such a case, at the timing when the irradiator 10 faces a predetermined direction, the receiver 50 faces a predetermined direction corresponding to the direction. That is, by synchronizing the rotational driving of the irradiator 10 with the rotational driving of the receiver 50, even if the irradiation direction is changed in various directions by the irradiator 10, the receiver 50 is capable of properly receiving the reflected wave. In addition, the irradiator 10 and the receiver 50 may be made of the same member (mirror).

The computing unit 20 computes the distance between the object irradiated with the electromagnetic waves and the measurement device 200, based on the signal received by the receiver 50. The computing unit 20 is realized by any combination of hardware and software mainly on a CPU of any computer, a memory, a program loaded in the memory, a storage medium such as a hard disk that stores the program, and a network connection interface. There are various modification examples of the implementation method and apparatus. The computing unit 20 may be realized by the integrated circuit 100 that realizes the control unit 204 and the sending unit 206.

Here, a hardware configuration of the measurement unit 202 in the case where the irradiator 10 emits light will be illustrated. The same configuration can also be adopted for the measurement unit 202 in a case where the irradiator 10 emits electromagnetic waves.

Figure 5:
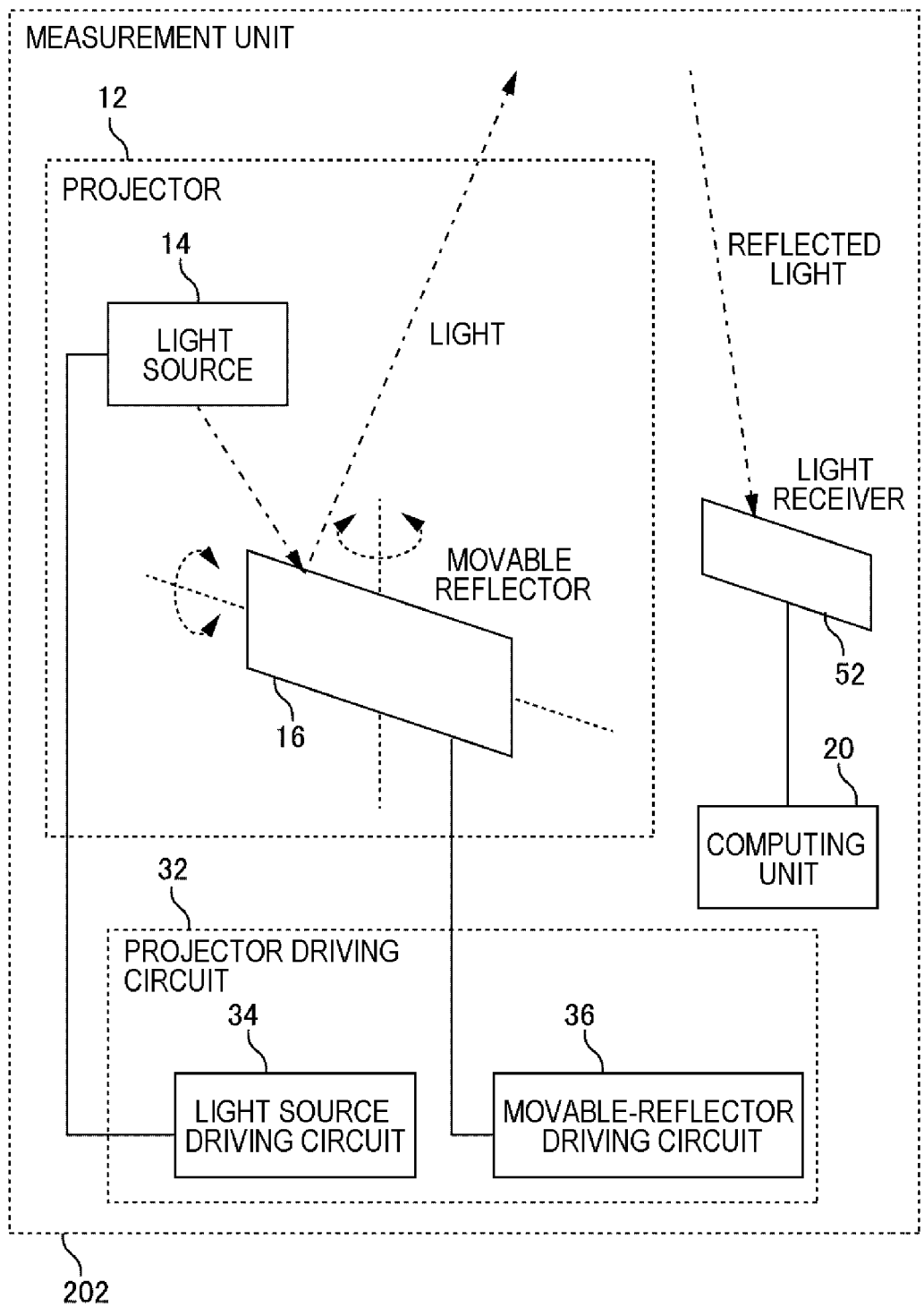
FIG. 5 is a diagram illustrating a hardware configuration of the measurement unit that emits light.
Figure 12:
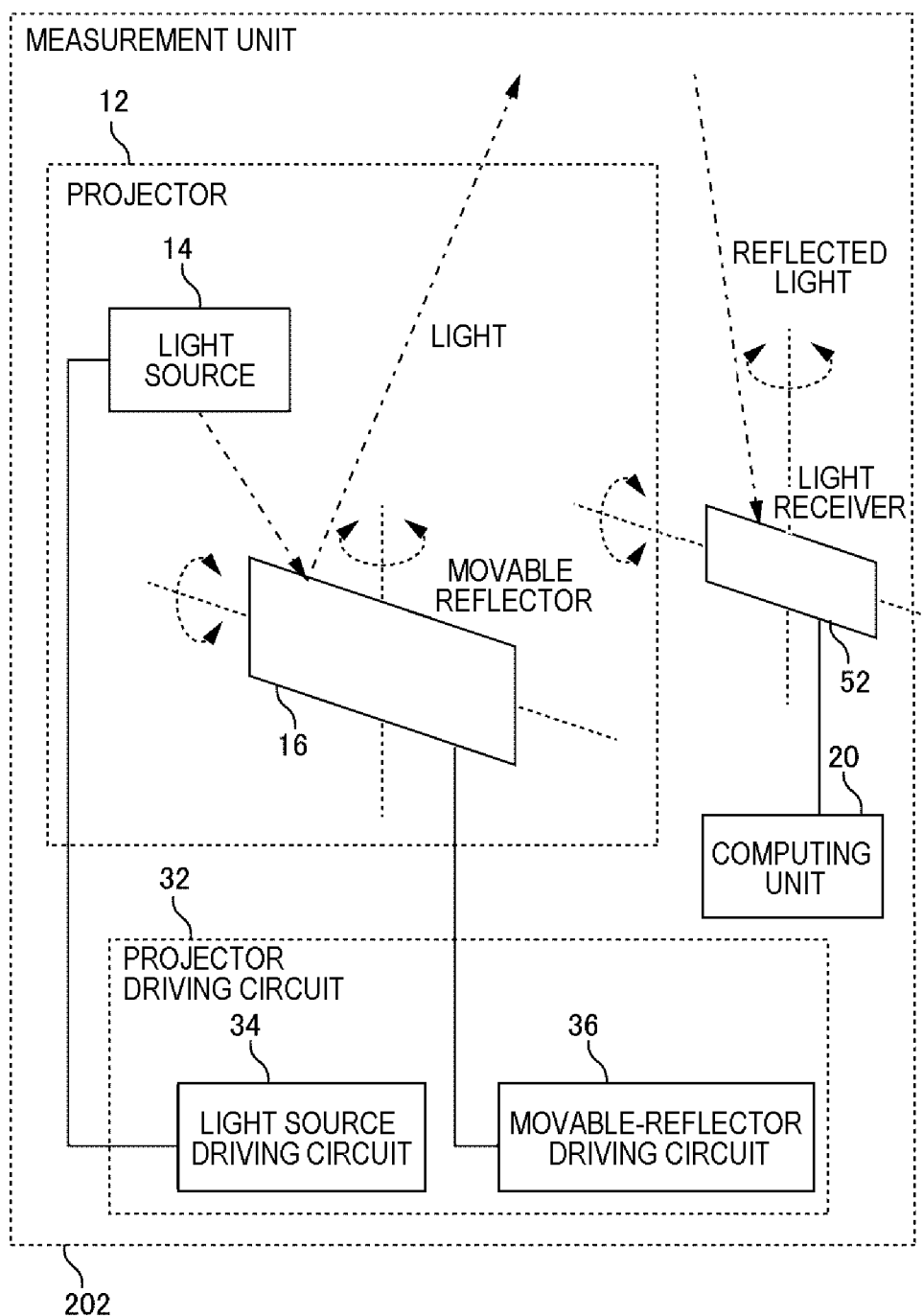
FIG. 12 is a diagram illustrating a hardware configuration of the measurement unit that emits light.

FIG. 5 and FIG. 12 are diagrams illustrating a hardware configuration of the measurement unit 202 that emits light. A projector 12 and a projector driving circuit 32 in FIGS. 5 and 12 are examples of the irradiator 10 and the irradiator driving circuit 30 in FIGS. 3 and 11, respectively. The projector 12 includes a light source 14 and a movable reflector 16. The projector driving circuit 32 includes a light source driving circuit 34 and a movable-reflector driving circuit 36.

The light source 14 is any light source that emits light. The light source driving circuit 34 is a circuit for driving the light source 14 by controlling the supply of electric power to the light source 14. The light emitted by the light source 14 is, for example, a laser beam. In this case, for example, the light source 14 is a semiconductor laser that emits a laser beam.

The movable reflector 16 reflects the light emitted from the light source 14. The light reflected by the movable reflector 16 is emitted to the outside of the measurement device 200. The movable-reflector driving circuit 36 is a circuit for driving the movable reflector 16. For example, the movable reflector 16 has one mirror configured to be rotatable at least in two directions, the vertical direction and the horizontal direction. The mirror is, for example, a micro electro mechanical system (MEMS) mirror.

Note that, the configuration of the movable reflector 16 is not limited to the configurations shown in FIGS. 5 and 12. For example, the movable reflector 16 may be configured with two mirrors whose rotation axes cross each other.

In FIGS. 5 and 12, the measurement unit 202 includes a light receiver 52. The light receiver 52 is an example of the receiver 50 in FIGS. 3 and 11. The light receiver 52 receives the reflected light of the light emitted to the outside of the measurement device 200. For example, the light receiver 52 has an avalanche photodiode (APD). As shown in FIG. 12, the light receiver 52 may be configured be driven to rotate similarly to the movable reflector 16. The rotational driving of the light receiver 52 is controlled by a driving circuit (not shown). Note that, the rotational driving of the movable reflector 16 and the rotational driving of the light receiver 52 may be performed in synchronization with each other. In such a case, at the timing when the movable reflector 16 faces a predetermined direction, the light receiver 52 faces a predetermined direction corresponding to the direction.

Note that, the configuration of the measurement unit 202 is not limited to the configurations shown in FIGS. 3, 5, 11, and 12. For example, in FIGS. 5 and 12, the measurement unit 202 is configured to be able to emit light in various directions, by reflecting the light emitted from the light source 14 by the movable reflector 16. However, the configuration for emitting light in various directions is not limited to the configurations shown in FIGS. 5 and 12. For example, the light source 14 itself may have a mechanism that rotates in the vertical direction and the horizontal direction. In this case, the measurement unit 202 can emit light in various directions by controlling the pose of the light source 14. In this case, the measurement unit 202 may not have the movable reflector 16 and the movable-reflector driving circuit 36. In this case, the light source driving circuit 34 controls the attitude of the light source 14 in addition to the light emission by the light source 14. As shown in FIG. 12, in a case where the light receiver 52 is configured to be driven to rotate, the control of the pose of the light source 14 and the rotational driving of the light receiver 52 may be performed in synchronization with each other.

Note that, the hardware (see FIG. 2) for realizing the control unit 204 and the sending unit 206 and the hardware for realizing the measurement unit 202 (see FIGS. 3 and 5) may be packaged in one housing, or may be packaged in separate housings.

"Installation Example of Measurement Device 200"

Figure 6:
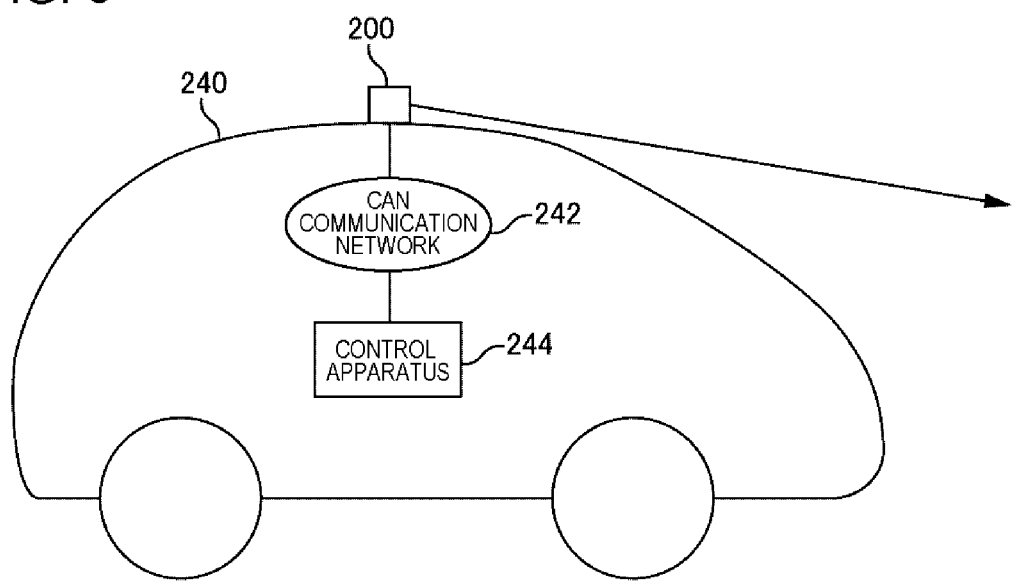
FIG. 6 is a diagram illustrating the measurement device installed to a moving body.

The measurement device 200 is installed to (in/on) a moving body such as a car or a train, for example. FIG. 6 is a diagram illustrating the measurement device 200 installed to a moving body 240. In FIG. 6, the measurement device 200 is fixed to the upper part of the moving body 240. Further, the measurement device 200 is connected to the control apparatus 244 through a CAN communication network 242. Note that, the connection through the CAN communication network 242 is just an example. The control apparatus 244 is a control apparatus that controls the moving body 240. For example, the control apparatus 244 is an electronic control unit (ECU).

Figure 4:
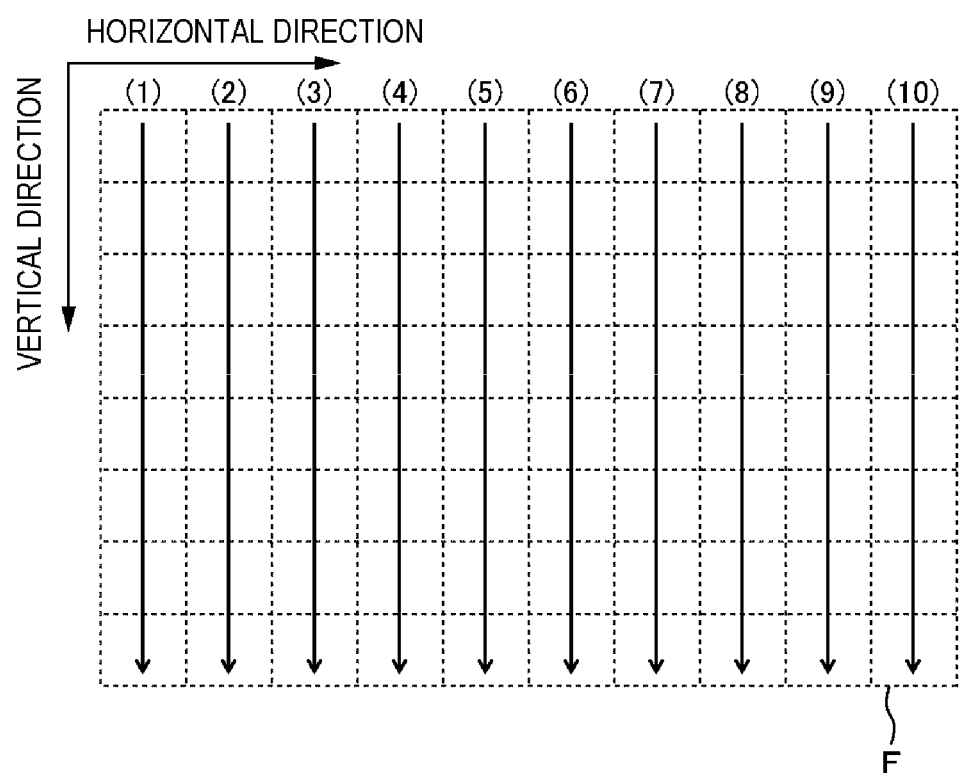
FIG. 4 is a diagram for explaining a scanning method of the measurement device.

The measurement device 200 is installed such that the vertical direction in FIG. 4 is the height direction of the moving body 240 and the horizontal direction in FIG. 4 is the width direction of the moving body 240.

Here, the control unit 204 may be realized as apart of the control apparatus 244 which controls the moving body 240. In this case, a program module for realizing the above-described control unit 204 is stored in the storage device of the control apparatus 244.

Note that, the place where the measurement device 200 is installed is not limited to the upper portion of the moving body 240. For example, the measurement device 200 may be installed inside (for example, indoors) the moving body 240.

<Function>

Next, the functions of the functional configuration units shown in FIG. 1 will be described in detail.

"Functions of Measurement Unit 202 and Control Unit 204"

The measurement unit 202 performs measurement by emitting electromagnetic waves and scanning an object with the electromagnetic waves. For example, the measurement unit 202 scans a target area with the electromagnetic waves, and computes the distance between the object irradiated with the electromagnetic waves and the measurement device 200. Then, the measurement unit 202 outputs the measurement result including the position of the object irradiated with the electromagnetic waves in the target area, and the distance between the object and the measurement device 200.

The measurement unit 202 is operable in a first scan mode in which the object (in other words, an area to be scanned) is scanned in a first direction, or a second scan mode in which the object is scanned in a second direction different from the first direction. The second direction may be opposite to the first direction. In a state where the measurement device 200 is mounted to (on/in) the moving body, the first direction is, for example, a direction from the left to the right with respect to the traveling direction of the moving body. In a state where the measurement device 200 is mounted to the moving body, the second direction is, for example, a direction from the right to the left with respect to the traveling direction. And, the measurement unit 202 performs vertical scanning in the height direction of the moving body.

Note that, the measurement unit 202 may also be operable in a third scan mode in which the object is scanned by performing a reciprocating operation in the first direction and the second direction.

That is, the measurement unit 202 is operable in any one or at least two out of "first scan mode in which scanning is performed while moving the vertical scanning line in one direction from left to right", "second scan mode in which scanning is performed while moving the vertical scanning line in one direction from right to left", and "third scan mode in which scanning is performed while reciprocating the vertical scanning line in the left and right directions". As examples in which the measurement unit 202 is operable in a plurality of scan modes, an example in which the measurement unit 202 is operable in the first to third scan modes, an example in which the measurement unit 202 is operable in the first and second scan modes, and the like are illustrated. The measurement device 200 is installed such that the vertical direction is the height direction of the moving body 240 and the left and right directions are the width direction of the moving body 240.

Here, the first to third scan modes will be described with reference to FIG. 4. In FIG. 4, the target area F is divided into a matrix shape.

In the first scan mode, for example, the column (1) positioned on the leftmost side is scanned in the vertical direction, and then the column (2), which is to the immediate right thereof, is scanned in the vertical direction. Thereafter, the column (3), which is to the immediate right thereof, the column (4), and the column (5) are scanned in the vertical direction in this order while moving in the right direction one by one. Then, after the column (10) positioned on the rightmost side is scanned in the vertical direction, the process returns to the column (1) and the column (1) is scanned in the vertical direction. Thereafter, the same process is repeated. Note that, in FIG. 4, the scanning in the vertical direction is performed in a direction from top to bottom, but it may be performed in a direction from bottom to top. Further, scanning in the direction from top to bottom and scanning in the direction from bottom to top may be alternately performed one by one (for example, the column (1) is scanned in the direction from top to bottom and the column (2) is scanned in the direction from bottom to top).

In the second scan mode, for example, the column (10) positioned on the rightmost side is scanned in the vertical direction, and then the column (9), which is to the immediate left thereof, is scanned in the vertical direction. Thereafter, the column (8), which is to the immediate left thereof, the column (7), and the column (6) are scanned in the vertical direction in this order while moving in the left direction one by one. Then, after the column (1) positioned on the leftmost side is scanned in the vertical direction, the process returns to the column (10) and the column (10) is scanned in the vertical direction. Thereafter, the same process is repeated. Note that, in FIG. 4, the scanning in the vertical direction is performed in a direction from top to bottom, but it may be performed in a direction from bottom to top. Further, scanning in the direction from top to bottom and scanning in the direction from bottom to top may be alternately performed one by one (for example, the column (10) is scanned in the direction from top to bottom and the column (9) is scanned in the direction from bottom to top).

In the third scan mode, for example, the column (1) positioned on the leftmost side is scanned in the vertical direction, and then the column (2), which is to the immediate right thereof, is scanned in the vertical direction. Thereafter, the column (3), which is to the immediate right thereof, the column (4), and the column (5) are scanned in the vertical direction in this order while moving in the right direction one by one. Then, after the column (10) positioned on the rightmost side is scanned in the vertical direction, the column (10) is scanned again in the vertical direction. Next, the column (9), which is to the immediate left thereof, is scanned in the vertical direction. Thereafter, the column (8), which is to the immediate left thereof, the column (7), and the column (6) are scanned in the vertical direction in this order while moving in the left direction one by one. Then, after the column (1) positioned on the leftmost side is scanned in the vertical direction, the column (1) is scanned again in the vertical direction. Next, the column (2), which is to the immediate right thereof, is scanned in the vertical direction. Thereafter, the column (3), which is to the immediate right thereof, the column (4), and the column (5) are scanned in the vertical direction in this order while moving in the right direction one by one. Thereafter, the same process is repeated. Note that, in FIG. 4, the scanning in the vertical direction is performed in a direction from top to bottom, but it may be performed in a direction from bottom to top. Further, scanning in the direction from top to bottom and scanning in the direction from bottom to top may be alternately performed one by one (for example, the column (1) is scanned in the direction from top to bottom and the column (2) is scanned in the direction from bottom to top).

In a case where the measurement unit 202 is operable in a plurality of scan modes, the control unit 204 determines "a scan mode to be executed by the measurement unit 202".

The control unit 204 can determine the scan mode, based on the moving state of the moving body. As an example, the control unit 204 can determine the scan mode, based on the steering signal of the steering wheel of the moving body 240. Note that, "determining the scan mode" in this specification can be rephrased as "determining the direction in which the measurement unit 202 scans the object."

The control unit 204 can acquire a steering signal of the steering wheel, from, for example, an electronic control apparatus that acquires sensor signals from sensors installed at various positions of the moving body 240. A specific example of the determination process based on the steering signal of the steering wheel of the moving body 240 will be described below.

—In a Case Where the Measurement Unit 202 is Operable in the First to Third Scan Modes—

In a case where the steering wheel is turned to the left by a first predetermined angle or more (the first state), the control unit 204 may determine the scan mode to be executed by the measurement unit 202 as the first scan mode. Further, in a case where the steering wheel is turned to the right by the first predetermined angle or more (the second state), the control unit 204 may determine the scan mode to be executed by the measurement unit 202 as the second scan mode. Further, in a case where the steering angle of the steering wheel is the other (the third state), the control unit 204 may determine the scan mode to be executed by the measurement unit 202 as the third scan mode. That is, in a case where it is predicted that the vehicle is travelling substantially straight, the scan mode to be executed by the measurement unit 202 may be determined as the third scan mode.

—In a Case Where the Measurement Unit 202 is Operable in the First and Second Scan Modes—

In a case where the steering wheel is turned to the left by a first predetermined angle or more (the first state), the control unit 204 may determine the scan mode to be executed by the measurement unit 202 as the first scan mode. Further, in a case where the steering wheel is turned to the right by the first predetermined angle or more (the second state), the control unit 204 may determine the scan mode to be executed by the measurement unit 202 as the second scan mode.

Further, in a case where the steering angle of the steering wheel is the other (the third state), the control unit 204 may determine the scan mode to be executed by the measurement unit 202 as the first or second scan mode. For example, a scan mode (first or second scan mode) determined as the scan mode to be executed by the measurement unit 202 in the third state may be determined in advance. Then, the control unit 204 may make a determination as a predetermined scan mode, in the third state.

In addition, the control unit 204 may determine the scan mode in the third state, according to the state (the first state or the second state) immediately before the third state is reached. For example, in a case where the state changes from the first state to the third state, the control unit 204 may determine the scan mode to be executed by the measurement unit 202 as the first scan mode, in the third state. Then, in a case where the state changes from the second state to the third state, the control unit 204 may determine the scan mode to be executed by the measurement unit 202 as the second scan mode, in the third state.

As another example, the control unit 204 can determine the scan mode, based on the planned travel route of the moving body 230.

For example, the control unit 204 acquires a planned travel route from the car navigation system. The car navigation system computes a route from the current position to the destination, based on the current position of the moving body 230 and the destination input by the user. The car navigation system may compute a plurality of routes and receive an input to select one among them from the user. The car navigation system transmits the finally determined route (planned travel route) to the control unit 204. A specific example of the determination process based on the planned travel route of the moving body 240 will be described below.

—In a Case Where the Measurement Unit 202 is Operable in the First to Third Scan Modes—

In a case where it is predicted that the steering wheel of the moving body 240 is turned to the left by a second predetermined angle or more within a predetermined traveling distance from the current position, based on the planned travel route (first' state), the control unit 204 may determine the scan mode to be executed by the measurement unit 202 as the first scan mode. In a case where it is predicted that the steering wheel of the moving body 240 is turned to the right by a second predetermined angle or more within a predetermined traveling distance from the current position, based on the planned travel route (second' state), the control unit 204 may determine the scan mode to be executed by the measurement unit 202 as the second scan mode. In a case where it is not predicted that the steering wheel of the moving body 240 is turned to the left or be turned to the right by a second predetermined angle or more within a predetermined traveling distance from the current position, based on the planned travel route (third' state), the control unit 204 may determine the scan mode to be executed by the measurement unit 202 as the third scan mode. That is, in a case where it is predicted that a vehicle travels substantially straight within a predetermined traveling distance (or a predetermined time), based on the planned travel route, the control unit may determine the scan mode to be executed by the measurement unit 202 as the third scan mode.

For example, in a case where there is a left turn by a third predetermined angle or more within a predetermined traveling distance from the current position, on the planned travel route, the control unit 204 may predict that "the steering wheel of the moving body 240 is turned to the left by a second predetermined angle or more within a predetermined traveling distance from the current position". Further, in a case where there is a right turn by a third predetermined angle or more within a predetermined traveling distance from the current position, on the planned travel route, the control unit 204 may predict that "the steering wheel of the moving body 240 is turned to the right by a second predetermined angle or more within a predetermined traveling distance from the current position". Further, in a case where there is no left turn or right turn by a third predetermined angle or more within a predetermined traveling distance from the current position, on the planned travel route, the control unit 204 may predict that "the steering wheel of the moving body 240 will not be turned to the left or right by a second predetermined angle or more within a predetermined traveling distance from the current position".

—In a Case Where the Measurement Unit 202 is Operable in the First and Second Scan Modes—

In a case where it is predicted that the steering wheel of the moving body 240 is turned to the left by a second predetermined angle or more within a predetermined traveling distance from the current position, based on the planned travel route (first' state), the control unit 204 may determine the scan mode to be executed by the measurement unit 202 as the first scan mode. In a case where it is predicted that the steering wheel of the moving body 240 is turned to the right by a second predetermined angle or more within a predetermined traveling distance from the current position, based on the planned travel route (second' state), the control unit 204 may determine the scan mode to be executed by the measurement unit 202 as the second scan mode.

In a case where it is not predicted that the steering wheel of the moving body 240 is turned to the left or be turned to the right by a second predetermined angle or more within a predetermined traveling distance from the current position, based on the planned travel route (third' state), the control unit 204 may determine the scan mode to be executed by the measurement unit 202 as the first or second scan mode. For example, a scan mode (first or second scan mode) determined in the third' state may be determined in advance. Then, the control unit 204 may determine a predetermined scan mode, in the third' state.

In addition, the control unit 204 may determine the scan mode in the third' state, according to the state (the first' state or the second' state) immediately before the third' state is reached. For example, in a case where the state changes from the first' state to the third' state, the control unit 204 may determine the scan mode to be executed by the measurement unit 202 as the first scan mode, in the third' state. Then, in a case where the state changes from the second' state to the third' state, the control unit 204 may determine the scan mode to be executed by the measurement unit 202 as the second scan mode, in the third' state.

In addition, the control unit 204 may determine the scan mode to be executed by the measurement unit 202, based on a signal indicating the state of a direction indicator such as the turn signal of the moving body 240. In a case where the measurement unit 202 is operable in the first to third scan modes, the control unit 204 can make a determination as the first scan mode when the turn signal indicates a left turn, as the second scan mode when the turn signal indicates a right turn, and as the third scan mode when the turn signal does not indicate either a left turn or right turn. Further, in a case where the measurement unit 202 is operable in the first and second scan modes, the control unit 204 can make a determination as the first scan mode when the turn signal indicates a left turn, as the second scan mode when the turn signal indicates a right turn, and as the first mode or second mode when the turn signal does not indicate either a left turn or right turn (for example, in the same manner as above). Note that, when determining the scan mode in this manner, only when the turn signal continuously indicates the direction for a predetermined time or more, the scan mode corresponding to the direction may be determined.

In addition, the control unit 204 may detect that the steering wheel is turned to the left or right by a predetermined level (angle) or more, based on the image of the exterior surroundings of the moving body 240 captured by a camera attached to the moving body 240. Then, the control unit 204 may determine the scan mode to be executed by the measurement unit 202, based on the detection result. In a case where the measurement unit 202 is operable in the first to third scan modes, the control unit 204 can make a determination as the first scan mode when the steering wheel is turned to the left by a predetermined level (angle) or more, as the second scan mode when the steering wheel is turned to the right by a predetermined level (angle) or more, and as the third mode in other cases. Further, in a case where the measurement unit 202 is operable in the first and second scan modes, the control unit 204 can make a determination as the first scan mode when the steering wheel is turned to the left by a predetermined level (angle) or more, as the second scan mode when the steering wheel is turned to the right by a predetermined level (angle) or more, and as the first mode or the second mode in other cases (for example, makes a determination in the same manner as the above). Further, the control unit 204 may determine the scan mode to be executed by the measurement unit 202, based on the detection results of a sensor (for example, a gyro sensor, an acceleration sensor, or a tilt sensor) other than the camera.

There is no particular limitation on a method of detecting that the steering wheel is turned to the right and left by a predetermined level (angle) or more based on the image. For example, by analyzing a plurality of frame images, it may be detected that the camera is swung to the left or right by a predetermined level or more. In a case where the camera is swung to the left by a predetermined level or more, it may be detected that the steering wheel is turned to the left by a predetermined level (angle) or more, and in a case where the camera is swung to the right by a predetermined level or more, it may be detected that the steering wheel is turned to the right by a predetermined level (angle) or more.

Note that, the control unit 204 may be operable in a plurality of determination modes for determining the scan mode based on each of a plurality of signals. For example, the control unit 204 may be operable in a first determination mode in which the scan mode is determined based on the steering signal of the steering wheel of the moving body 240 and in a second determination mode in which the scan mode is determined based on the planned travel route of the moving body 240. Then, the control unit 204 may switch the determination mode according to the traveling speed of the moving body 240.

For example, the control unit 204 may select the second determination mode in a case where the traveling speed of the moving body 240 is the first predetermined value or more, and select the first determination mode in a case where the traveling speed of the moving body 240 is less than the first predetermined value.

In addition, in a case where the traveling speed of the moving body 240 is less than the second predetermined value, the control unit 204 may fix the scan mode to be executed by the measurement unit 202 in one scan mode. Then, in a case where the traveling speed of the moving body 240 is the second predetermined value or more, the scan mode to be executed by the measurement unit 202 may be determined from among a plurality of the scan modes, based on a steering signal of the steering wheel of the moving body 240 or a planned travel route of the moving body 240.

The control unit 204 can acquire the traveling speed of the moving body 240, from, for example, an electronic control apparatus that acquires sensor signals from sensors installed at various positions of the moving body 240.

"Functions of Sending Unit 206 and Control Unit 204"

The sending unit 206 sends the measurement result (including the position of the object irradiated with the electromagnetic waves in the target area, and the distance between the object and the measurement device 200) output by the measurement unit 202, to the data processing unit 300. The sending unit 206 may send (output) data indicating the intensity of the reflected wave received by the receiver 50 to the data processing unit 300, as the measurement result output by the measurement unit 202. The data indicating the intensity of the reflected wave may be point group data indicating the intensity of the reflected wave of each area (for example, each mesh in FIG. 4) constituting one frame.

The sending unit 206 is operable in a first sending mode in which "after a measurement result of an entire one frame is acquired, the measurement result of the entire one frame is sent", or a second sending mode in which "before a measurement result of an entire one frame is acquired, the measurement result of a part of the one frame is sent". Note that, the sending unit 206 may be operable in both the first sending mode and the second sending mode, or may be operable in only one of them.

Here, the first and second sending modes will be described with reference to FIG. 4. The measurement unit 202 performs scanning while moving the vertical scanning line in the horizontal direction. Then, the measurement unit 202 processes the reception signal received by the receiver 50 in the reception order, and computes the distance (measurement result) between the object irradiated with the electromagnetic waves and the measurement device 200. Therefore, the measurement results are computed in the order of scanning. For example, in a case where scanning in the vertical direction is performed in the order of the column (1), the column (2), the column (3), and . . . shown in FIG. 4, the measurement result is computed in this order.

In the first sending mode, after the measurement results of one frame (the measurement results of the columns (1) to (10) in the example of FIG. 4) are computed, the sending unit 206 sends the measurement results to the data processing unit 300.

In the second sending mode, before the measurement results of one frame (the measurement results of the columns (1) to (10) in the example of FIG. 4) are computed, the sending unit 206 sends a part of the measurement results computed so far, to the data processing unit 300. Then, the remaining measurement results are sent to the data processing unit 300 thereafter. For example, the measurement results of the columns (1) to (5) in the example of FIG. 4 are sent first, and then the measurement results of the remaining columns (6) to (10) are sent.

That is, in the first sending mode, the sending unit 206 sends the measurement results (measurement data) after a predetermined amount (point group data for one frame) of measurement data acquired by the measurement unit 202 is accumulated. Then, in the second sending mode, the sending unit 206 sends the measurement results (measurement data), before the predetermined amount of measurement data acquired by the measurement unit 202 is accumulated.

Note that, here, the example of sending the measurement results in two steps of the first half and the second half has been described, but the measurement results may be divided into parts of the other number. Further, the number of data items (for example: the number of columns) to be sent at each time may be equal or different.

In a case where the sending unit 206 is operable in a plurality of sending modes, the control unit 204 determines "sending mode to be executed by the sending unit 206".

As an example, the control unit 204 may determine a sending mode to be executed by the sending unit 206, based on the steering signal of the steering wheel of the moving body 240. For example, in a case where "the steering wheel of the moving body 240 is turned to the left by a fourth predetermined angle or more" or "the steering wheel of the moving body 240 is turned to the right by a fourth predetermined angle or more" is satisfied, the control unit 204 may determine the sending mode to be executed by the sending unit 206 as the second sending mode. In other cases, the control unit 204 may determine the sending mode to be executed by the sending unit 206 as the first sending mode.

As another example, the control unit 204 may determine the sending mode to be executed by the sending unit 206, based on the steering signal of the steering wheel of the moving body 240 and the traveling speed of the moving body 240. For example, in a case where "the steering wheel of the moving body 240 is turned to the left by a fifth predetermined angle or more and the moving speed of the moving body 240 is a third predetermined value or more" or "the steering wheel of the moving body 240 is turned to the right by a fifth predetermined angle or more and the moving speed of the moving body 240 is a third predetermined value or more" is satisfied, the control unit 204 may determine the sending mode to be executed by the sending unit 206 as the second sending mode. In other cases, the control unit 204 may determine the sending mode to be executed by the sending unit 206 as the first sending mode.

As another example, the control unit 204 may determine the sending mode to be executed by the sending unit 206, based on the planned travel route of the moving body 240. For example, in a case where "it is predicted that the steering wheel of the moving body 240 is turned to the left by a sixth predetermined angle or more within a predetermined traveling distance from the current position, based on the planned travel route", or "it is predicted that the steering wheel of the moving body 240 is turned to the right by a sixth predetermined angle or more within a predetermined traveling distance from the current position, based on the planned travel route" is satisfied, the control unit 204 may determine the sending mode to be executed by the sending unit 206 as the second sending mode. In other cases, the control unit 204 may determine the sending mode to be executed by the sending unit 206 as the first sending mode.

As another example, the control unit 204 may determine the sending mode to be executed by the sending unit 206, based on the planned travel route of the moving body 240, and the traveling speed of the moving body 240. For example, in a case where "it is predicted based on the planned travel route that the steering wheel of the moving body 240 is turned to the left by a seventh predetermined angle or more within a predetermined traveling distance from the current position, and the moving speed of the moving body 240 is a fourth predetermined value or more", or "it is predicted based on the planned travel route that the steering wheel of the moving body 240 is turned to the right by a seventh predetermined angle or more within a predetermined traveling distance from the current position, and the moving speed of the moving body 240 is a fourth predetermined value or more" is satisfied, the control unit 204 may determine the sending mode to be executed by the sending unit 206 as the second sending mode. In other cases, the control unit 204 may determine the sending mode to be executed by the sending unit 206 as the first sending mode.

As another example, the control unit 204 may determine the sending mode to be executed by the sending unit 206, based on the traveling speed of the moving body 240. For example, in a case where the moving speed of the moving body 240 is a fifth predetermined value or more, the control unit 204 may determine the sending mode to be executed by the sending unit 206 as the second sending mode. In other cases, the control unit 204 may determine the sending mode to be executed by the sending unit 206 as the first sending mode.

As another example, the control unit 204 may determine the sending mode to be executed by the sending unit 206, based on an image of the exterior surroundings of the moving body 240 captured by a camera attached to the moving body 240. For example, in a case where "detecting that the steering wheel is turned to the left by a predetermined level (angle) or more" or "detecting that the steering wheel is turned to the right by a predetermined level (angle) or more" is satisfied, the control unit 204 may determine the sending mode to be executed by the sending unit 206 as the second sending mode. In other cases, the control unit 204 may determine the sending mode to be executed by the sending unit 206 as the first sending mode.

As another example, the control unit 204 may determine the sending mode to be executed by the sending unit 206, based on an image of the exterior surroundings of the moving body 240 captured by a camera attached to the moving body 240, and the traveling speed of the moving body 240. For example, in a case where "detecting that the steering wheel is turned to the right by a predetermined level (angle) or more and the moving speed of the moving body 240 is a predetermined value or more" or "detecting that the steering wheel is turned to the left by a predetermined level (angle) or more and the moving speed of the moving body 240 is a predetermined value or more" is satisfied, the control unit 204 may determine the sending mode to be executed by the sending unit 206 as the second sending mode. In other cases, the control unit 204 may determine the sending mode to be executed by the sending unit 206 as the first sending mode.

Note that, the first to seventh predetermined angles may be the same value or different values. Further, the first to fifth predetermined values may be the same value or different values. Further, with respect to the first to seventh predetermined angles and the first to fifth predetermined values, appropriate values may be set by experiment, simulation or the like in advance, for the purpose of detecting a feature, an obstacle, or the like in the vicinity of the moving body.

Here, a modification example will be described. In the above-described embodiment, in the second sending mode, before the measurement results of one frame are acquired, the sending unit 206 sends the measurement results of a part of one frame, acquired so far, (for example, the measurement results of the columns (1) to (5) in the example of FIG. 4) to the data processing unit 300, and then sends the remaining measurement results (for example, the measurement results of the columns (6) to (10) in the example of FIG. 4) to the data processing unit 300.

As a modification example, in the second sending mode, the remaining measurement results (for example, the measurement results of the columns (6) to (10) in the example of FIG. 4) may not be sent to the data processing unit 300. In such a case, the control unit 204 controls the measurement unit 202 so as to repeatedly scan only a part of one frame (for example, the columns (1) to (5) in the example of FIG. 4) and perform measurement.

That is, in the modification example, in the second sending mode, the measurement unit 202 measures the measurement results of a part of one frame (for example, the measurement results of the columns (1) to (5) in the example of FIG. 4), and does not measure the measurement results of the remaining part of one frame (for example, the measurement results of the columns (6) to (10) in the example of FIG. 4). Then, the sending unit 206 sends the measurement results of a part of one frame (for example, the measurement results of the columns (1) to (5) in the example of FIG. 4), and does not send the measurement results of the remaining part of one frame (for example, the measurement results of the columns (6) to (10) in the example of FIG. 4).

As another example, the control unit 204 can determine at least one of the scan mode and the sending mode, based on the current position of the moving body 230 or the like.

The measurement device 200 may include a map information acquisition unit that acquires map information from, for example, a car navigation system, a map distribution server (not shown), or the like. The map information includes information on features, and other traffic information. The information on the feature includes information indicating the position of the feature, information indicating the attribute of the feature, and the like. Further, the traffic information includes information indicating the locations of accident-prone spots and areas, other spots or areas requiring special attention when a driver drives (such as spots into which pedestrians are likely to run out such as school zones, intersections with poor visibility, and spots where it is likely to be blind spots of a driver).

Further, the measurement device 200 may include a current position acquisition unit that acquires information on the current position of the moving body. The current position acquisition unit may acquire information on the current position from a GPS-receiving apparatus (not shown) or the above-described car navigation system. Note that, the information on the current position in the present embodiment may be the current position information of the moving body or the current position information of the measurement device itself.

Further, the measurement device 200 may include a traveling direction acquisition unit that acquires information on a traveling direction of the moving body. The traveling direction acquisition unit may acquire the information on the traveling direction, from the car navigation apparatus described above, or by recognizing or estimating the traveling direction of the moving body from another sensor or the like (for example, a speed sensor, an acceleration sensor, or the like).

The control unit 204 determines at least one of the scan mode and the sending mode, based on the information acquired by the map information acquisition unit, the current position acquisition unit, and the traveling direction acquisition unit.

Specifically, in a case where it can be determined or inferred that for example, a spot or an area requiring drivers of special attention such as accident-prone spot is located on the left side with respect to the traveling direction, based on the map information and the current position (and the traveling direction), the control unit 204 controls the measurement device 200 so as to operate in the first scan mode. Further, in this case, the control unit 204 controls the measurement device 200 so as to operate in the second sending mode.

On the other hand, in a case where it can be determined or inferred that for example, an accident-prone spot or the like is located on the right side with respect to the traveling direction, based on the map information and the current position (and the traveling direction), the control unit 204 controls the measurement device 200 so as to operate in the second scan mode. Further, in this case, the control unit 204 controls the measurement device 200 so as to operate in the second sending mode.

Further, in a case where it can be determined or inferred that for example, an accident-prone spot or the like is not present around the moving body (within a predetermined range from the current position), based on the map information and the current position (and the traveling direction), the control unit 204 controls the measurement device 200 so as to operate in the third scan mode. Further, in this case, the control unit 204 controls the measurement device 200 so as to operate in the first sending mode.

By causing the measurement device to operate like this, objects (such as other vehicles, pedestrians, or other obstacles) positioned in spots or areas where drivers should pay special attention such as accident-prone spots can be detected quickly. Further, in cases other than traveling in a place requiring special attention, it is possible to reduce the operation amount of the irradiator and to reduce the time taken to shift to the next frame during scanning.

<<Example of Measurement Device>>

Next, an example of the measurement device 200 of the present embodiment will be illustrated. Note that, the measurement device 200 of the present embodiment is not limited to the example.

EXAMPLE 1

In the present example, the measurement unit 202 is operable in the first to third scan modes. Further, the sending unit 206 is operable in the first and second sending modes. Then, the control unit 204 determines the scan mode and the sending mode, based on the steering signal of the steering wheel of the moving body 240.

Figure 7:
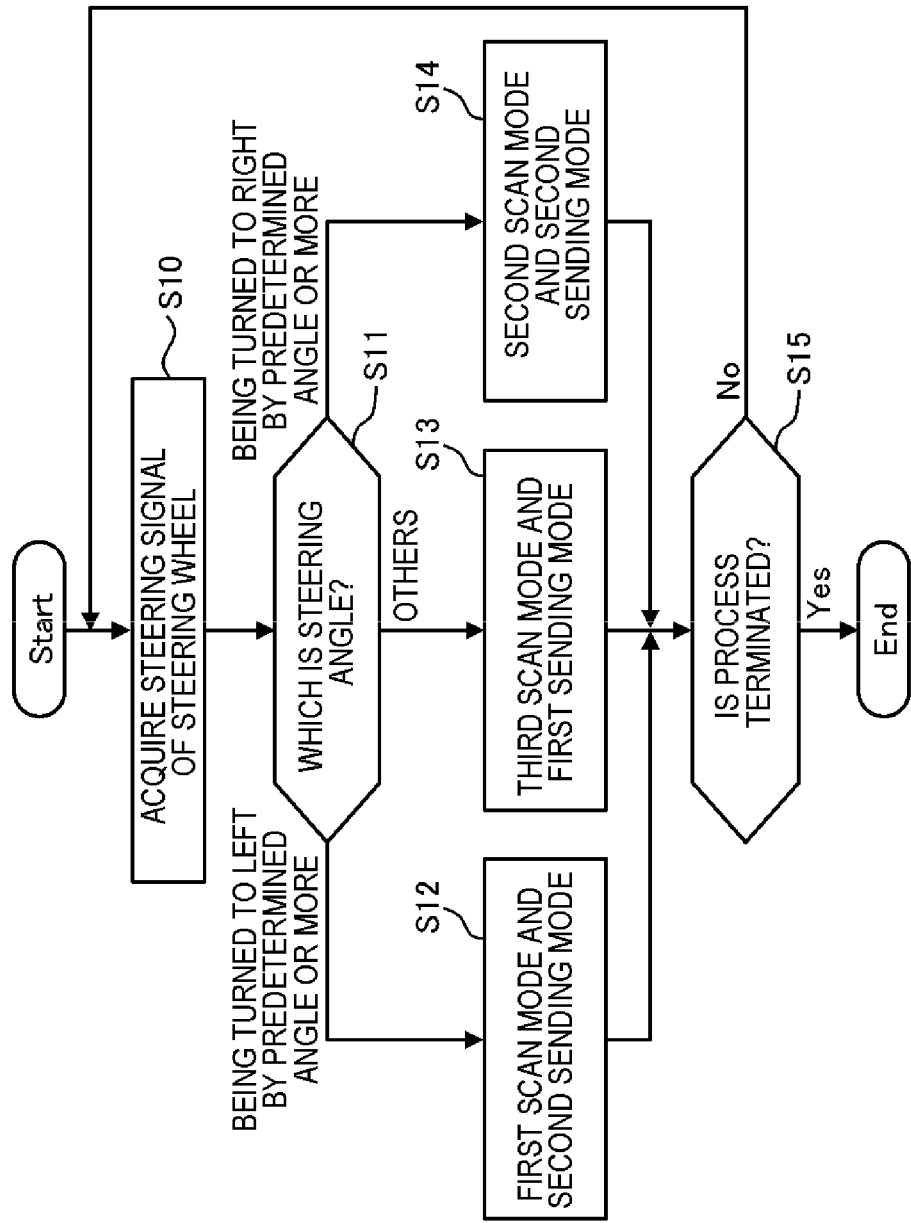
FIG. 7 is a flowchart showing an example of a flow of a process of the measurement device.

The flowchart of FIG. 7 shows an example of the flow of a process of the measurement device 200 of the present example. For example, the process starts in response to engine start of the moving body 240 or the like.

In S10, the control unit 204 acquires the steering signal of the steering wheel. The control unit 204 determines the state of the steering angle of the steering wheel (S11).

In a case where the steering wheel is turned to the left by a predetermined angle or more (S11), the control unit 204 makes a determination as the first scan mode and the second sending mode (S12).

Then, the measurement unit 202 executes the first scan mode, and the sending unit 206 executes the second sending mode. That is, the measurement unit 202 performs scan while moving the vertical scanning line in one direction from the left to the right. Before the measurement results of the entire one frame are acquired, the sending unit 206 sends the measurement results of apart of one frame. Then, the sending unit 206 sends the remaining measurement results of the frame thereafter.

In a case where the steering wheel is turned to the right by a predetermined angle or more (S11), the control unit 204 makes a determination as the second scan mode and the second sending mode (S14).

Then, the measurement unit 202 executes the second scan mode, and the sending unit 206 executes the second sending mode. That is, the measurement unit 202 performs scan while moving the vertical scanning line in one direction from the right to the left. Before the measurement results of the entire one frame are acquired, the sending unit 206 sends the measurement results of apart of one frame. Then, the sending unit 206 sends the remaining measurement results of the frame thereafter.

In a case where the steering angle of the steering wheel is the other (S11), the control unit 204 makes a determination as the third scan mode and the first sending mode (S13).

Then, the measurement unit 202 executes the third scan mode, and the sending unit 206 executes the first sending mode. That is, the measurement unit 202 performs scan while reciprocating the vertical scanning line in the left and right directions. After the measurement results of the entire one frame are acquired, the sending unit 206 sends the measurement results of the entire one frame.

Thereafter, the process is repeated until a signal for terminating the process (for example: a signal indicating the engine stop of the moving body 240) is detected.

According to the example, at the time of turning right, the vertical scanning line can be moved in one direction from the right to the left. Therefore, measurement results are acquired in order from the right side as viewed from the moving body 240. In the case of the example, a part of the measurement results can be sent without waiting for the measurement results of the entire one frame to send. According to such an example, at the time of turning right, an object positioned on the right side of the moving body 240 can be detected quickly.

Further, according to the example, at the time of turning left, the vertical scanning line can be moved in one direction from the left to the right. Therefore, measurement results are acquired in order from the left side as viewed from the moving body 240. In the case of the example, a part of the measurement results can be sent without waiting for the measurement results of the entire one frame to send. According to such an example, at the time of turning left, an object positioned on the left side of the moving body 240 can be detected quickly.

Further, according to the example, in a case where it is not a right turn or a left turn (for example, during traveling straight), and in a case where there is no urgency to "quickly detect right-hand objects or left-hand objects", the vertical scanning line can be reciprocated in the left and right directions. In this case, compared to the other scan modes, it is possible to reduce the operation amount of the irradiator 10 (the movable reflector 16 and the light source 14) when shifting from any frame to the next frame. Due to this, the waiting time therebetween can be reduced.

In the case of the first scan mode, after performing the scanning of the column (10) of FIG. 4, it is necessary to operate the irradiator 10 in order to perform the scanning of the column (1). In the case of the second scan mode, after performing the scanning of the column (1) of FIG. 4, it is necessary to operate the irradiator 10 in order to perform the scanning of the column (10). In the case of the third scan mode, such a large operation is unnecessary.

A modification example of the example will be described. The measurement unit 202 is operable in the first and second scan modes, and may not operate in the third scan mode. Then, the control unit 204 may make a determination as the first scan mode or the second scan mode instead of the third scan mode in S13. In this case as well, the same advantageous effect can be realized.

In addition, the control unit 204 may acquire the image of the exterior surroundings of the moving body 240 captured by a camera attached to the moving body 240, instead of the steering signal of the steering wheel. Then, the control unit 204 may analyze the image and detect that the steering wheel of the moving body 240 is turned to the left or right by a predetermined level (angle) or more. Then, the first scan mode and the second sending mode may be determined when the steering wheel of the moving body 240 is turned to the left by a predetermined level (angle) or more, the second scan mode and the second sending mode may be determined when the steering wheel of the moving body 240 is turned to the right by a predetermined level (angle) or more, and the third scan mode and the first sending mode may be determined in other cases.

EXAMPLE 2

In the present example, the measurement unit 202 is operable in the first to third scan modes. Further, the sending unit 206 is operable in the first and second sending modes. Then, the control unit 204 determines the scan mode and the sending mode, based on the planned travel route of the moving body 240.

Figure 8:
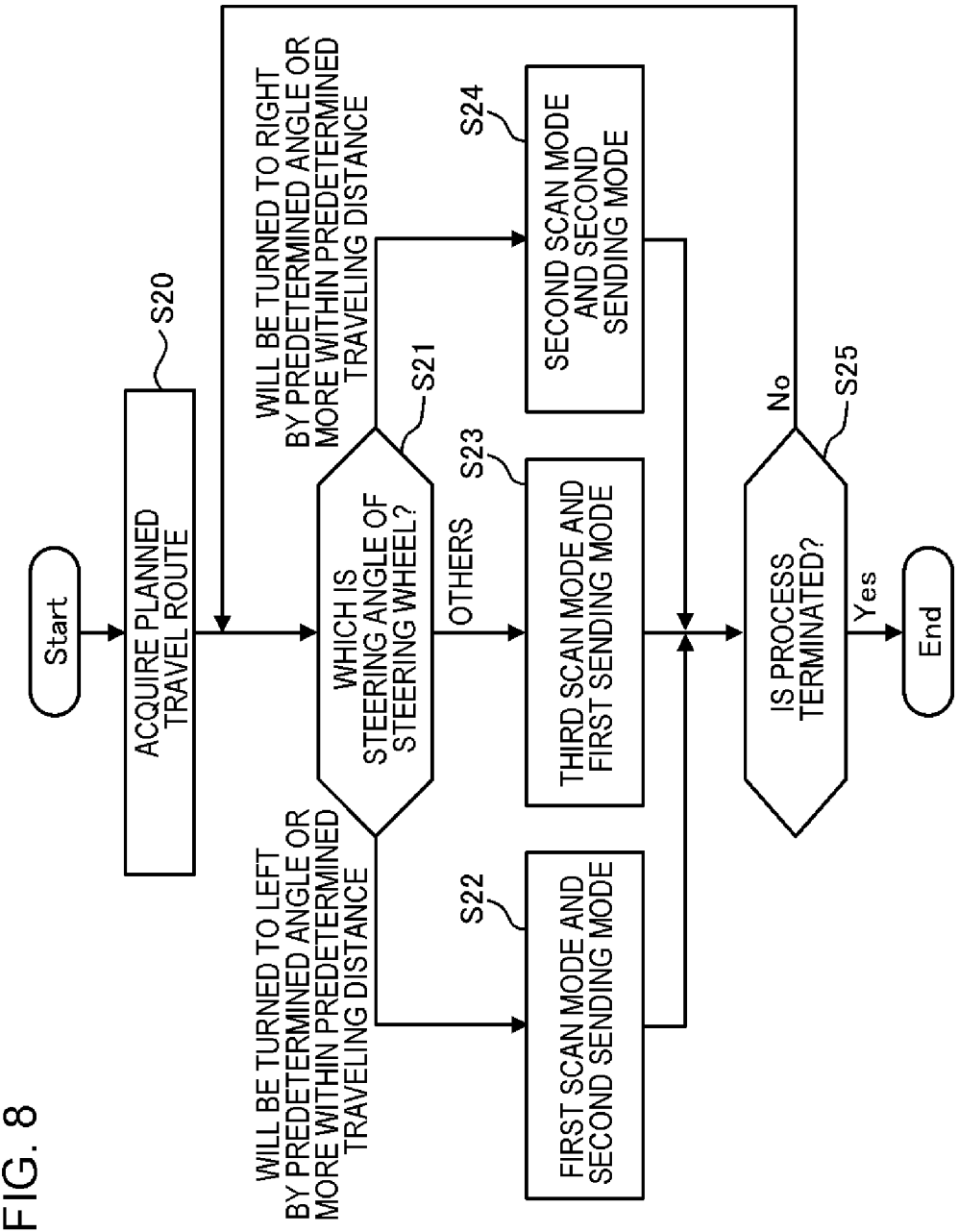
FIG. 8 is a flowchart showing an example of the flow of the process of the measurement device.

The flowchart of FIG. 8 shows an example of the flow of the process of the measurement device 200 of the present example. For example, the process starts in response to engine start of the moving body 240 or the like.

In S20, the control unit 204 acquires the planned travel route of the moving body 240. Then, the control unit 204 predicts the state of the steering angle of the steering wheel, based on the planned travel route (S21).

In a case where it is predicted that the steering wheel of the moving body 240 is turned to the left by a predetermined angle or more within a predetermined traveling distance from the current position (S21), the control unit 204 makes a determination as the first scan mode and the second sending mode (S22).

Then, the measurement unit 202 executes the first scan mode, and the sending unit 206 executes the second sending mode. That is, the measurement unit 202 performs scan while moving the vertical scanning line in one direction from the left to the right. Before the measurement results of the entire one frame are acquired, the sending unit 206 sends the measurement results of a part of one frame. Then, the sending unit 206 sends the remaining measurement results of the frame thereafter.

In a case where it is predicted that the steering wheel of the moving body 240 is turned to the right by a predetermined angle or more within a predetermined traveling distance from the current position (S21), the control unit 204 makes a determination as the second scan mode and the second sending mode (S24).

Then, the measurement unit 202 executes the second scan mode, and the sending unit 206 executes the second sending mode. That is, the measurement unit 202 performs scan while moving the vertical scanning line in one direction from the right to the left. Before the measurement results of the entire one frame are acquired, the sending unit 206 sends the measurement results of a part of one frame. Then, the sending unit 206 sends the remaining measurement results of the frame thereafter.

In a case where it is not predicted that the steering wheel of the moving body 240 is turned to the right or be turned to the left by a predetermined angle or more within a predetermined traveling distance from the current position (S21), the control unit 204 makes a determination as the third scan mode and the first sending mode (S23).

Then, the measurement unit 202 executes the third scan mode, and the sending unit 206 executes the first sending mode. That is, the measurement unit 202 performs scan while reciprocating the vertical scanning line in the left and right directions. After the measurement results of the entire one frame are acquired, the sending unit 206 sends the measurement results of the entire one frame.

Thereafter, the process is repeated until a signal for terminating the process (for example: a signal indicating the engine stop of the moving body 240) is detected.

In the example as well, the same advantageous effect as Example 1 is realized. Further, if the scan mode and the sending mode are switched according to the steering signal of the steering wheel, there is a concern of delay in detection of a right-hand object at the time of turning right or detection of a left-hand object at the time of turning left. According to the example in which the steering angle of the steering wheel is predicted based on the planned travel route and the scan mode and the sending mode are switched according to the prediction results, it is possible to perform switching to an appropriate mode before the timing of turning the steering wheel to turn right or to turn left. As a result, the inconvenience can be mitigated.

A modification example of the example will be described. The measurement unit 202 is operable in the first and second scan modes, and may not operate in the third scan mode. Then, the control unit 204 may make a determination as the first scan mode or the second scan mode instead of the third scan mode in S23. In this case as well, the same advantageous effect can be realized.

EXAMPLE 3

In the present example, the measurement unit 202 is operable in the first to third scan modes. Further, the sending unit 206 is operable in the first and second sending modes. Then, the control unit 204 determines the scan mode and the sending mode, based on the steering signal of the steering wheel of the moving body 240 and the traveling speed.

Figure 9:
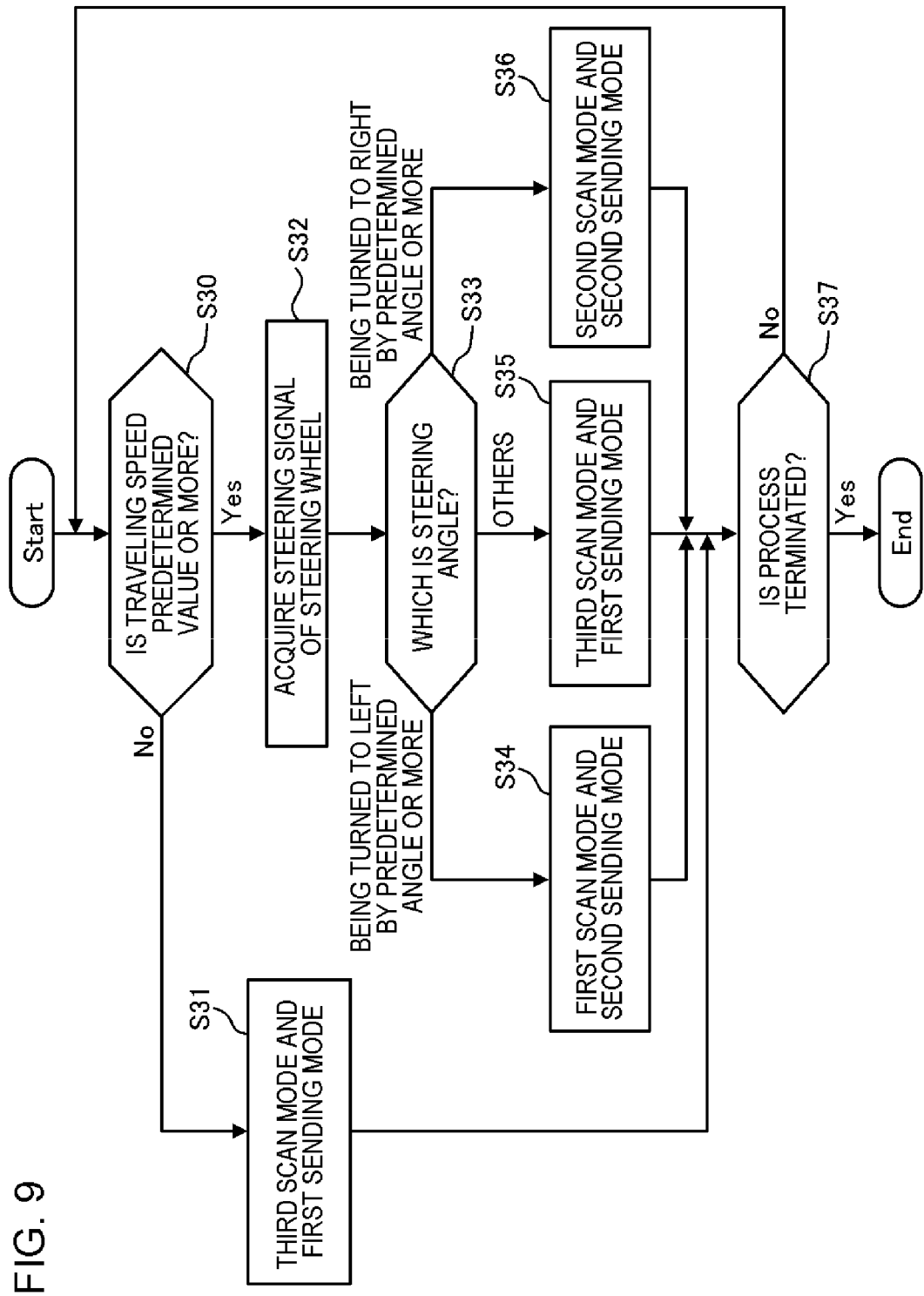
FIG. 9 is a flowchart showing an example of the flow of the process of the measurement device.

The flowchart of FIG. 9 shows an example of the flow of the process of the measurement device 200 of the present example. For example, the process starts in response to engine start of the moving body 240 or the like.

In S30, the control unit 204 acquires the traveling speed of the moving body 240 and determines whether the traveling speed is a predetermined value or more.

In a case where the traveling speed is less than a predetermined value (No in S30), the control unit 204 makes a determination as the third scan mode and the first sending mode (S31).

Then, the measurement unit 202 executes the third scan mode, and the sending unit 206 executes the first sending mode. That is, the measurement unit 202 performs scan while reciprocating the vertical scanning line in the left and right directions. After the measurement results of the entire one frame are acquired, the sending unit 206 sends the measurement results of the entire one frame.

In a case where the traveling speed is a predetermined value or more (Yes in S30), the process proceeds to S32. In S32, the control unit 204 acquires the steering signal of the steering wheel. The control unit 204 determines the state of the steering angle of the steering wheel (S33).

In a case where the steering wheel is turned to the left by a predetermined angle or more (S33), the control unit 204 makes a determination as the first scan mode and the second sending mode (S34).

Then, the measurement unit 202 executes the first scan mode, and the sending unit 206 executes the second sending mode. That is, the measurement unit 202 performs scan while moving the vertical scanning line in one direction from the left to the right. Before the measurement results of the entire one frame are acquired, the sending unit 206 sends the measurement results of a part of one frame. Then, the sending unit 206 sends the remaining measurement results of the frame thereafter.

In a case where the steering wheel is turned to the right by a predetermined angle or more (S33), the control unit 204 makes a determination as the second scan mode and the second sending mode (S36).

Then, the measurement unit 202 executes the second scan mode, and the sending unit 206 executes the second sending mode. That is, the measurement unit 202 performs scan while moving the vertical scanning line in one direction from the right to the left. Before the measurement results of the entire one frame are acquired, the sending unit 206 sends the measurement results of a part of one frame. Then, the sending unit 206 sends the remaining measurement results of the frame thereafter.

In a case where the steering angle of the steering wheel is the other (S33), the control unit 204 makes a determination as the third scan mode and the first sending mode (S35).

Then, the measurement unit 202 executes the third scan mode, and the sending unit 206 executes the first sending mode. That is, the measurement unit 202 performs scan while reciprocating the vertical scanning line in the left and right directions. After the measurement results of the entire one frame are acquired, the sending unit 206 sends the measurement results of the entire one frame.

Thereafter, the process is repeated until a signal for terminating the process (for example: a signal indicating the engine stop of the moving body 240) is detected.

According to the example, in a case where the traveling speed of the moving body 240 is a high speed of a predetermined value or more and the moving body 240 turns to the right, the vertical scanning line can be moved in one direction from the right to the left. Therefore, measurement results are acquired in order from the right side as viewed from the moving body 240. In the case of the example, a part of the measurement results can be sent without waiting for the measurement results of the entire one frame to send. According to such an example, in a case where the traveling speed of the moving body 240 is a high speed of a predetermined value or more and the moving body 240 is turned to the right, an object positioned on the right side of the moving body 240 can be detected quickly.

Further, according to the example, in a case where the traveling speed of the moving body 240 is a high speed of a predetermined value or more and the moving body 240 is turned to the left, the vertical scanning line can be moved in one direction from the left to the right. Therefore, measurement results are acquired in order from the left side as viewed from the moving body 240. In the case of the example, a part of the measurement results can be sent without waiting for the measurement results of the entire one frame to send. According to such an example, in a case where the traveling speed of the moving body 240 is a high speed of a predetermined value or more and the moving body 240 is turned to the left, an object positioned on the left side of the moving body 240 can be detected quickly.

Further, according to the example, in a case where the traveling speed of the moving body 240 is a low speed less than the predetermined value, or in a case where the traveling speed of the moving body 240 is a high speed of a predetermined value or more but it is not a right turn or a left turn (for example, during traveling straight), that is, there is no urgency to "quickly detect right-hand objects or left-hand objects", the vertical scanning line can be reciprocated in the left and right directions. In this case, compared to the other scan modes, it is possible to reduce the operation amount of the irradiator 10 (the movable reflector 16 and the light source 14) when shifting from any frame to the next frame. Due to this, the waiting time therebetween can be reduced.

A modification example of the example will be described. The measurement unit 202 is operable in the first and second scan modes, and may not operate in the third scan mode. Then, the control unit 204 may make a determination as the first scan mode or the second scan mode instead of the third scan mode in S31 and S35. In this case as well, the same advantageous effect can be realized.

In addition, the control unit 204 may acquire the image of the exterior surroundings of the moving body 240 captured by a camera attached to the moving body 240, instead of the steering signal of the steering wheel. Then, the control unit 204 may analyze the image and detect that the steering wheel of the moving body 240 is turned to the left or right by a predetermined level (angle) or more. Then, the first scan mode and the second sending mode may be determined when the steering wheel of the moving body 240 is turned to the left by a predetermined level (angle) or more, the second scan mode and the second sending mode may be determined when the steering wheel of the moving body 240 is turned to the right by a predetermined level (angle) or more, and the third scan mode and the first sending mode may be determined in other cases.

EXAMPLE 4

In the present example, the measurement unit 202 is operable in the first to third scan modes. Further, the sending unit 206 is operable in the first and second sending modes. Then, the control unit 204 determines the scan mode and the sending mode, based on the planned travel route of the moving body 240 and the traveling speed.

Figure 10:
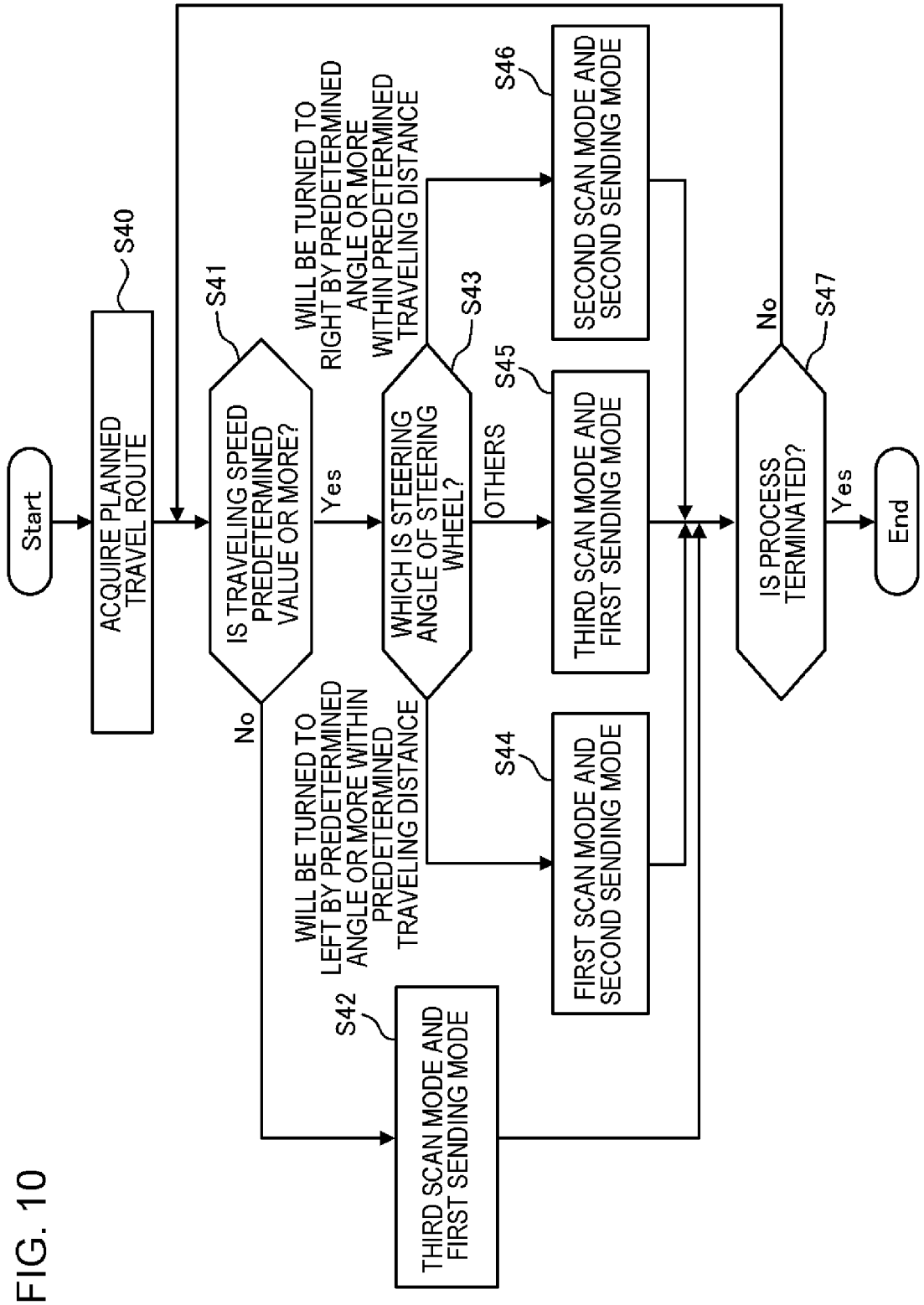
FIG. 10 is a flowchart showing an example of the flow of the process of the measurement device.

The flowchart of FIG. 10 shows an example of the flow of the process of the measurement device 200 of the present example. For example, the process starts in response to engine start of the moving body 240 or the like.

In S40, the control unit 204 acquires the planned travel route of the moving body 240. In S41, the control unit 204 acquires the traveling speed of the moving body 240 and determines whether the traveling speed is a predetermined value or more.

In a case where the traveling speed is less than a predetermined value (No in S41), the control unit 204 makes a determination as the third scan mode and the first sending mode (S42).

Then, the measurement unit 202 executes the third scan mode, and the sending unit 206 executes the first sending mode. That is, the measurement unit 202 performs scan while reciprocating the vertical scanning line in the left and right directions. After the measurement results of the entire one frame are acquired, the sending unit 206 sends the measurement results of the entire one frame.

In a case where the traveling speed is a predetermined value or more (Yes in S41), the process proceeds to S43. In S43, the control unit 204 predicts the state of the steering angle of the steering wheel, based on the planned travel route (S43).

In a case where it is predicted that the steering wheel of the moving body 240 is turned to the left by a predetermined angle or more within a predetermined traveling distance from the current position (S43), the control unit 204 makes a determination as the first scan mode and the second sending mode (S44).

Then, the measurement unit 202 executes the first scan mode, and the sending unit 206 executes the second sending mode. That is, the measurement unit 202 performs scan while moving the vertical scanning line in one direction from the left to the right. Before the measurement results of the entire one frame are acquired, the sending unit 206 sends the measurement results of apart of one frame. Then, the sending unit 206 sends the remaining measurement results of the frame thereafter.

In a case where it is predicted that the steering wheel of the moving body 240 is turned to the right by a predetermined angle or more within a predetermined traveling distance from the current position (S43), the control unit 204 makes a determination as the second scan mode and the second sending mode (S46).

Then, the measurement unit 202 executes the second scan mode, and the sending unit 206 executes the second sending mode. That is, the measurement unit 202 performs scan while moving the vertical scanning line in one direction from the right to the left. Before the measurement results of the entire one frame are acquired, the sending unit 206 sends the measurement results of a part of one frame. Then, the sending unit 206 sends the remaining measurement results of the frame thereafter.

In a case where it is not predicted that the steering wheel of the moving body 240 is turned to the right or be turned to the left by a predetermined angle or more within a predetermined traveling distance from the current position (S43), the control unit 204 makes a determination as the third scan mode and the first sending mode (S45).

Then, the measurement unit 202 executes the third scan mode, and the sending unit 206 executes the first sending mode. That is, the measurement unit 202 performs scan while reciprocating the vertical scanning line in the left and right directions. After the measurement results of the entire one frame are acquired, the sending unit 206 sends the measurement results of the entire one frame.

Thereafter, the process is repeated until a signal for terminating the process (for example: a signal indicating the engine stop of the moving body 240) is detected.

In the example as well, the same advantageous effect as Example 3 is realized. Further, if the scan mode and the sending mode are switched according to the steering signal of the steering wheel, there is a concern of delay in detection of a right-hand object at the time of turning right or detection of a left-hand object at the time of turning left is delayed. According to the embodiment in which the steering angle of the steering wheel is predicted based on the planned travel route and the scan mode and the sending mode are switched according to the prediction results, the inconvenience can be mitigated.

A modification example of the example will be described. The measurement unit 202 is operable in the first and second scan modes, and may not operate in the third scan mode. Then, the control unit 204 may make a determination as the first scan mode or the second scan mode instead of the third scan mode in S42 and S45. In this case as well, the same advantageous effect can be realized.

EXAMPLE 5

In the present example, the measurement unit 202 is operable in any one of the first to third scan modes. Further, the sending unit 206 is operable in the first and second sending modes. Then, the control unit 204 determines the sending mode, based on the traveling speed of the moving body 240.

For example, the process starts in response to engine start of the moving body 240 or the like. The control unit 204 acquires the traveling speed of the moving body 240 and determines whether it is a predetermined value or more.

In a case where the traveling speed is less than a predetermined value, the control unit 204 makes a determination as the first sending mode. Then, the sending unit 206 executes the first sending mode. That is, after the measurement results of the entire one frame are acquired, the sending unit 206 sends the measurement results of the entire one frame.

On the other hand, in a case where the traveling speed is a predetermined value or more, the control unit 204 makes a determination as the second sending mode. Then, the sending unit 206 executes the second sending mode. That is, before the measurement results of the entire one frame are acquired, the sending unit 206 sends the measurement results of a part of one frame. Then, the sending unit 206 sends the remaining measurement results of the frame thereafter.

Thereafter, the process is repeated until a signal for terminating the process (for example: a signal indicating the engine stop of the moving body 240) is detected.

According to the present example, in a case where the traveling speed of the moving body 240 is a high speed of a predetermined value or more, a part of the measurement results can be sent without waiting for the measurement results of the entire one frame to send. According to such an example, when the traveling speed of the moving body 240 is a high speed of a predetermined value or more, an object positioned around the moving body 240 can be detected quickly.

<<Advantageous Effects of Measurement Device>>

Next, the advantageous effect of the present embodiment will be described.

The measurement device 200 of the present embodiment is operable in at least two out of a first scan mode in which scanning is performed while moving the vertical scanning line in one direction from left to right, a second scan mode in which scanning is performed while moving the vertical scanning line in one direction from right to left, and a third scan mode in which scanning is performed while reciprocating the vertical scanning line in the left and right directions, and it is possible to execute an appropriate scan mode depending on the situation. The measurement device 200 of the present embodiment increases variations in scanning, which is preferable.

Further, according to the measurement device 200 of the present embodiment, before the measurement results of the entire one frame are acquired, the measurement results of a part of one frame can be sent. According to the measurement device 200 of the present embodiment, as compared to the case where the measurement results of the entire one frame are sent after the measurement results of the entire one frame are acquired, it is possible to accelerate the timing of sending apart of the measurement results. As a result, it is possible to quickly process the part of the measurement results and to quickly detect the objects included therein.

Further, according to the measurement device 200 of the present embodiment, it is configured to be operable in a first sending mode in which after measurement results of an entire one frame are acquired, the measurement results of the entire one frame are sent, and a second sending mode in which before measurement results of the entire one frame are acquired, measurement results of a part of one frame are sent, and it is possible to execute an appropriate sending mode according to the situation. The measurement device 200 of the present embodiment increases variations in sending measurement results, which is preferable.

Further, according to the measurement device 200 of the present embodiment, such a measurement device 200 can be mounted to the moving body 240 for use. The measurement device 200 of the present embodiment increases variations in scanning of the measurement device 200 mounted to the moving body 240 for use and variations in sending measurement results, which is preferable. By properly using a plurality of variations, accident prevention or the like is expected. Further, by performing scanning (determining the scan mode) according to the movement of the moving body, it becomes possible to more efficiently detect the object present around the moving body.

Further, according to the measurement device 200 of the present embodiment, it is possible to determine the scan mode and the sending mode, based on the steering signal of the steering wheel of the moving body 240. According to the measurement device 200 of the present embodiment as described above, by executing an appropriate scan mode or sending mode according to the steering wheel state, it is possible to accelerate the detection of the object present at a position expected under the situation. For example, by configuring the measurement device 200 as shown in Examples 1 and 3, it is possible to quickly detect an object located in a turning direction when the moving body turns right or left. As a result, accident prevention at the time of turning right or left is expected.

Further, according to the measurement device 200 of the present embodiment, it is possible to determine the scan mode and the sending mode, based on the steering signal and the traveling speed of the steering wheel of the moving body 240. According to the measurement device 200 of the present embodiment as described above, by executing an appropriate scan mode or sending mode according to the traveling speed and the steering wheel state, it is possible to accelerate the detection of the object present at a position expected under the situation. For example, by configuring the measurement device 200 as shown in Example 3, it is possible to quickly detect an object located in a turning direction when the moving body moves at a high speed and turns right or left. As a result, accident prevention at the time of turning right or left is expected. In other states (for example, during low-speed movement, traveling straight), normal processes (such as data sending on a frame basis) can be performed. As a result, the processing load of the measurement device 200 can be reduced.

Further, according to the measurement device 200 of the present embodiment, it is possible to determine the scan mode and the sending mode, based on the planned travel route of the moving body 240. According to the measurement device 200 of the present embodiment as described above, by executing an appropriate scan mode or sending mode according to the predicted steering wheel state of the moving body 240, it is possible to accelerate the detection of the object present at a position expected under the situation. For example, by configuring the measurement device 200 as shown in Examples 2 and 4, it is possible to quickly detect an object located in a turning direction when it is predicted that the moving body will turn right or left. As a result, accident prevention at the time of turning right or left is expected.

Further, according to the measurement device 200 of the present embodiment, it is possible to determine the scan mode and the sending mode, based on the planned travel route and the traveling speed of the moving body 240. According to the measurement device 200 of the present embodiment as described above, by executing an appropriate scan mode or sending mode according to the traveling speed or the predicted steering wheel state of the moving body 240, it is possible to accelerate the detection of the object present at a position expected under the situation. For example, by configuring the measurement device 200 as shown in Example 4, it is possible to quickly detect an object located in a turning direction when it is predicted that the moving body will move at a high speed and turn right or left. As a result, accident prevention at the time of turning right or left is expected. In other states (for example, during low-speed movement, traveling straight), normal processes (such as data sending on a frame basis) can be performed. As a result, the processing load of the measurement device 200 can be reduced.

Further, according to the measurement device 200 of the present embodiment, it is possible to determine the sending mode, based on the traveling speed of the moving body 240. For example, as described in Example 5, when the vehicle moves at a high speed, it is possible to execute the second sending mode in which the measurement results of apart of one frame is sent, before the measurement results of the entire one frame are acquired. As a result, an object positioned around the moving body 240 at the time of high-speed movement can be detected quickly. Thus, accident prevention or the like is expected. In other states (for example, during low-speed movement), normal processes (such as data sending on a frame basis) can be performed. As a result, the processing load of the measurement device 200 can be reduced.

Further, according to the measurement device 200 of the present embodiment, the control unit 204 is operable in a first determination mode in which the scan mode and the sending mode are determined based on the steering signal of the steering wheel of the moving body 240 and in a second determination mode in which the scan mode and the sending mode are determined based on the planned travel route of the moving body 240, and can execute an appropriate determination mode according to the situation.

For example, the control unit 204 can select the second determination mode in a case where the traveling speed of the moving body 240 is the first predetermined value or more, and select the first determination mode in a case where the traveling speed of the moving body 240 is less than the first predetermined value.

In a case where the moving body 240 moves at a high speed, if the scan mode and the sending mode are switched according to the steering signal of the steering wheel, there is a concern of delay in detection of a right-hand object at the time of turning right or detection of a left-hand object at the time of turning left is delayed. On the other hand, the planned travel route is simply a schedule, and there is a concern that the driver may not follow it.

According to the measurement device 200 of the present embodiment, in a case where the moving body 240 moves at a high speed, by determining the scan mode and the sending mode based on the planned travel route, it is possible to accelerate the detection of the right-hand object at the time of turning right and the detection of the left-hand object at the time of turning left. On the other hand, in a case where the moving body 240 moves at a low speed, there is less necessity of accelerating the detection of the object compared with the case where the moving body 240 is moving at a high speed, so the scan mode and the sending mode can be determined based on the steering signal of the steering wheel. As described above, according to the measurement device 200 of the present embodiment, it is possible to determine the scan mode and the sending mode in an appropriate determination mode according to the situation.

Further, according to the measurement device 200 of the present embodiment, in a case where the traveling speed of the moving body 240 is a low speed, the control unit 204 fixes the sending mode and the scan mode to the first sending mode and any scan mode. In a case where the traveling speed of the moving body 240 is a high speed, the control unit 204 can determine an appropriate scan mode and sending mode from among a plurality of scan modes and a plurality of sending modes, based on the steering signal of the steering wheel and the planned travel route of the moving body 240 (see Embodiments 3 and 4).

As described above, according to the measurement device 200 of the present embodiment, in a case where the moving body 240 moves at a high speed and there is an increased necessity for accelerating the detection of an object increases, it is possible to determine an appropriate scan mode and sending mode, from among a plurality of scan modes and a plurality of sending modes. Then, in a case where the moving body 240 moves at a low speed and the necessity of accelerating the detection of the object is relatively low, it is possible to make a determination as the fixed scan mode and sending mode. In this way, by executing the process of switching between a plurality of scan modes and a plurality of sending modes only when necessary, the processing load of the measurement device 200 can be reduced.

Further, according to the present embodiment, the scan mode and the sending mode can be determined, based on a signal indicating the state of the turn signal of the moving body, the image of the exterior surroundings of the moving body captured by a camera attached to the moving body, and other sensors (a gyro sensor, an acceleration sensor, a tilt sensor, or the like). In such a case as well, the same advantageous effect as the case based on the steering signal of the steering wheel and the planned travel route of the moving body can be realized.

Further, according to the present embodiment, in the second sending mode, it is possible to repeatedly output only data of a part of one frame. In such a case, it is expected that the detection of the right-hand or left-hand object can be accelerated by the period of time saved by not processing the remaining part of the one frame.

Although the embodiments and examples have been described above with reference to the drawings, these are examples of the present invention, and various configurations other than the above can be adopted.

This application claims priority based on Japanese Patent Application No. 2016-165818 filed on Aug. 26, 2016, and the disclosure of which is incorporated herein in its entirety.

The invention claimed is:

1. A measurement device mounted to a moving body, the measuring device comprising:
an irradiator and a receiver which perform measurement by emitting electromagnetic waves and scanning an object with the electromagnetic waves;
a memory configured to store instructions; and
a processor configured to execute the instructions to control the irradiator and the receiver,
wherein the irradiator and the receiver are operable in a first scan mode in which the object is scanned in a first direction, and a second scan mode in which the object is scanned in a second direction different from the first direction, and
wherein the processor determines a scan mode to be executed by the irradiator and the receiver based on a moving state of the moving body, and
wherein the processor:
acquires information on a current position of the moving body;
acquires information on a traveling direction of the moving body;
acquires map information; and
determines the scan mode, based on the information on the current position, the information on the traveling direction, and the map information.

2. The measurement device according to claim 1, wherein the first direction is a direction from left to right with respect to the traveling direction of the moving body,
wherein the second direction is a direction from right to left with respect to the traveling direction of the moving body, and
wherein the irradiator and the receiver perform vertical scanning in a height direction of the moving body.

3. The measurement device according to claim 1, wherein the processor determines the scan mode, based on a steering signal of a steering wheel of the moving body.

4. The measurement device according to claim 3, wherein the processor determines the scan mode as the first scan mode, in a case where the steering wheel is turned to left by a predetermined angle or more, and determines the scan mode as the second scan mode, in a case where the steering wheel is turned to right by a predetermined angle or more.

5. The measurement device according to claim 4, wherein the irradiator and the receiver are also operable in a third mode in which the object is scanned by performing a reciprocating operation in the first direction and the second direction, and
wherein the processor determines the scan mode as the third scan mode, in a case where the steering wheel is not turned to the left by a predetermined angle or more, and is not turned to the right by a predetermined angle or more.

6. The measurement device according to claim 1, wherein the processor determines the scan mode, based on a planned travel route of the moving body.

7. The measurement device according to claim 6, wherein the processor determines the scan mode as the first scan mode in a case where it is predicted that a steering wheel of the moving body is turned to left by a predetermined angle or more within a predetermined traveling distance, based on the planned travel route, and determines the scan mode as the second scan mode in a case where it is predicted that the steering wheel of the moving body is turned to right by a predetermined angle or more within a predetermined traveling distance, based on the planned travel route.

8. The measurement device according to claim 7, wherein the irradiator and the receiver are also operable in a third mode in which the object is scanned by performing a reciprocating operation in the first direction and the second direction, and
wherein the processor determines the scan mode as the third scan mode in a case where it is not predicted that the steering wheel of the moving body is turned to the left and the right by a predetermined angle or more within the predetermined traveling distance, based on the planned travel route.

9. The measurement device according to claim 1, wherein the processor is operable in a first determination mode in which the scan mode is determined based on a steering signal of a steering wheel of the moving body and in a second determination mode in which the scan mode is determined based on a planned travel route of the moving body, and switches the determination mode in accordance with a traveling speed of the moving body.

10. The measurement device according to claim 1, wherein the processor fixes the scan mode to any one of the scan modes, in a case where a traveling speed of the moving body is less than a predetermined value, and determines one of a plurality of the scan modes, based on a steering signal of a steering wheel of the moving body or a planned travel route of the moving body, in a case where the traveling speed of the moving body is a predetermined value or more.

11. A measurement method executed by a computer mounted to a moving body, the measurement method comprising:
performing measurement by emitting electromagnetic waves and scanning object with the electromagnetic waves; and
controlling the measurement,
wherein the measurement is operable in a first scan mode in which the object is scanned in a first direction, and a second scan mode in which the object is scanned in a second direction different from the first direction, and
wherein, in the controlling the measurement;
a scan mode to be executed in the measurement is determined based on a moving state of the moving body;
information on a current position of the moving body is acquired;
information on a traveling direction of the moving body is acquired;
map information is acquired; and
the scan mode, based on the information on the current position, the information on the traveling direction, and the map information is determined.

12. A non-transitory storage medium storing a program causing a computer mounted to a moving body to:
perform measurement by emitting electromagnetic waves and scanning an object with the electromagnetic waves; and
control the measurement,
wherein the measurement is operable in a first scan mode in which the object is scanned in a first direction, and a second scan mode in which the object is scanned in a second direction different from the first direction, and
wherein the computer:
determines a scan mode to be executed in the measurement based on a moving suite of the moving body;
acquires information on a current position of the moving body;
acquires information on a traveling direction of the moving body;

acquires map information; and
determines the scan mode, based on the information on the current position, the information on the trawling direction, and the map information.

13. A measurement device mounted to a moving body, the measurement device comprising:
an irradiator and a receiver which perform measurement by emitting electromagnetic waves and scanning an object with the electromagnetic waves;
a memory configured to store instructions; and
a processor configured to execute the instructions to control the irradiator and the receiver,
wherein the irradiator and the receiver are operable in a first scan mode in which the object is scanned in a first direction, and a second scan mode in which the object is scanned in a second direction different from the first direction, and
wherein the processor determines a scan mode, as one of the first scan mode and the second scan mode, based on a planned travel route of the moving body from a current position to a destination input by a user.

14. The measurement device according to claim 13, wherein the processor determines the scan mode as the first scan mode in a case where it is predicted that a steering wheel of the moving body is turned to left by a predetermined angle or more within a predetermined traveling distance, based on the planned travel route, and determines the scan mode as the second scan mode in a case where it is predicted that the steering wheel of the moving body is turned to right by a predetermined angle or more within a predetermined traveling distance, based on the planned travel route.

15. A measurement device mounted to a moving laxly, measurement device comprising:
an irradiator and a receiver which perform measurement by emitting electromagnetic waves and scanning an object with the electromagnetic waves;
a memory configured to store instructions; and
a processor configured to execute the instructions to control the irradiator and the receiver,
wherein the irradiator and the receiver are operable in a first scan mode in which the object is scanned in a first direction, and a second scan mode in which the object is scanned in a second direction different from the first direction, and
wherein the processor is operable in a first determination mode in which the scan mode is determined based on a steering signal of a steering wheel of the moving body and in a second determination mode in which the scan mode is determined based on a planned travel route of the moving body, and switches the determination mode in accordance with a traveling speed of the moving body.

16. A measurement method executed by a computer mounted to a moving body, the measurement method comprising:
performing measurement by emitting electromagnetic waves and scanning an object with the electromagnetic waves; and
controlling the measurement,
wherein the measurement is operable in a first scan mode in which the object is scanned in a first direction from left to right with respect to a traveling direction of the moving body, and a second scan mode in which the object is scanned in a second direction, different from the first direction, the second direction being a direction from right to left with respect to the traveling direction of the moving body,
wherein, in the controlling the measurement, a scan mode, as one of the first scan mode and the second scan mode, is determined based on a planned travel route of the moving body from a current position to a destination input by a user, and
wherein the performing measurement is performed by a vertical scanning in a height direction of the moving body.

* * * * *